(12) United States Patent
Nakata

(10) Patent No.: US 8,264,731 B1
(45) Date of Patent: Sep. 11, 2012

(54) PRINTING MANAGEMENT SYSTEM AND PRINTING MANAGEMENT METHOD

(75) Inventor: Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/468,206

(22) Filed: May 10, 2012

Related U.S. Application Data

(63) Continuation of application No. 11/555,772, filed on Nov. 2, 2006, now Pat. No. 8,199,356.

(30) Foreign Application Priority Data

Nov. 4, 2005 (JP) .................................. 2005-321397

(51) Int. Cl.
 *G06K 1/00* (2006.01)
 *G06F 15/00* (2006.01)

(52) U.S. Cl. .................... 358/1.16; 358/1.6; 358/1.18

(58) Field of Classification Search ................. 358/1.14, 358/1.15, 1.16, 1.6, 1.13, 1.17, 1.18, 403, 358/444, 296; 709/104, 103, 102, 101, 100, 709/9, 10, 8, 1, 2
See application file for complete search history.

(56) References Cited

U.S. PATENT DOCUMENTS

| 7,228,339 B2 * | 6/2007 | Yamamoto et al. ........... 709/217 |
| 2005/0111045 A1 * | 5/2005 | Imai ............................. 358/1.18 |
| 2006/0077420 A1 * | 4/2006 | Okamoto et al. ............ 358/1.14 |

\* cited by examiner

*Primary Examiner* — Twyler Haskins
*Assistant Examiner* — Jonathan Beckley
(74) *Attorney, Agent, or Firm* — Cowan, Liebowitz & Latman, P.C.

(57) ABSTRACT

According to this invention, a printing management system which manages a log of a print job includes a creation unit which creates log information for specifying a print job on the basis of issued print job data, a save unit which saves the log information created by the creation unit in a save location corresponding to the log information in a storage unit, a determination unit which determines, in accordance with a request to access the log information saved in the save unit, whether to permit or reject the access request, and an access unit which reads log information subjected to the access request when the determination unit determines to permit the access request.

7 Claims, 21 Drawing Sheets

| ATTRIBUTE | SYNTAX | VALUE | |
|---|---|---|---|
| name | Unicode CHARACTER STRING | "UserB" | ~1201 |
| ⋮ | ⋮ | ⋮ | |
| textExtract | DWORD | 0x0001 | ~1202 |
| imageExtract | DWORD | 0x0004 | ~1203 |
| storeFolder | Unicode CHARACTER STRING | "LogFolder2" | ~1204 |

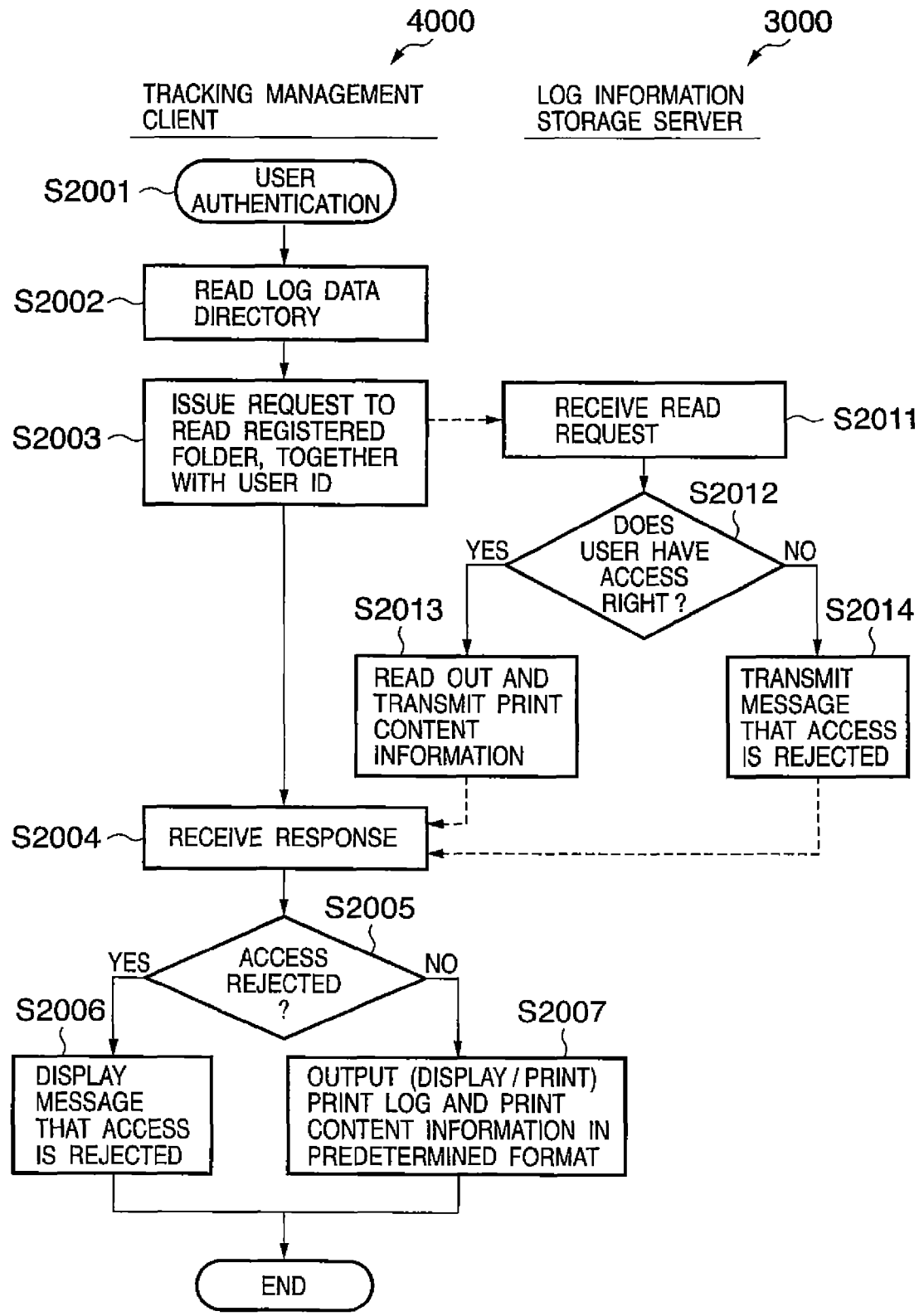

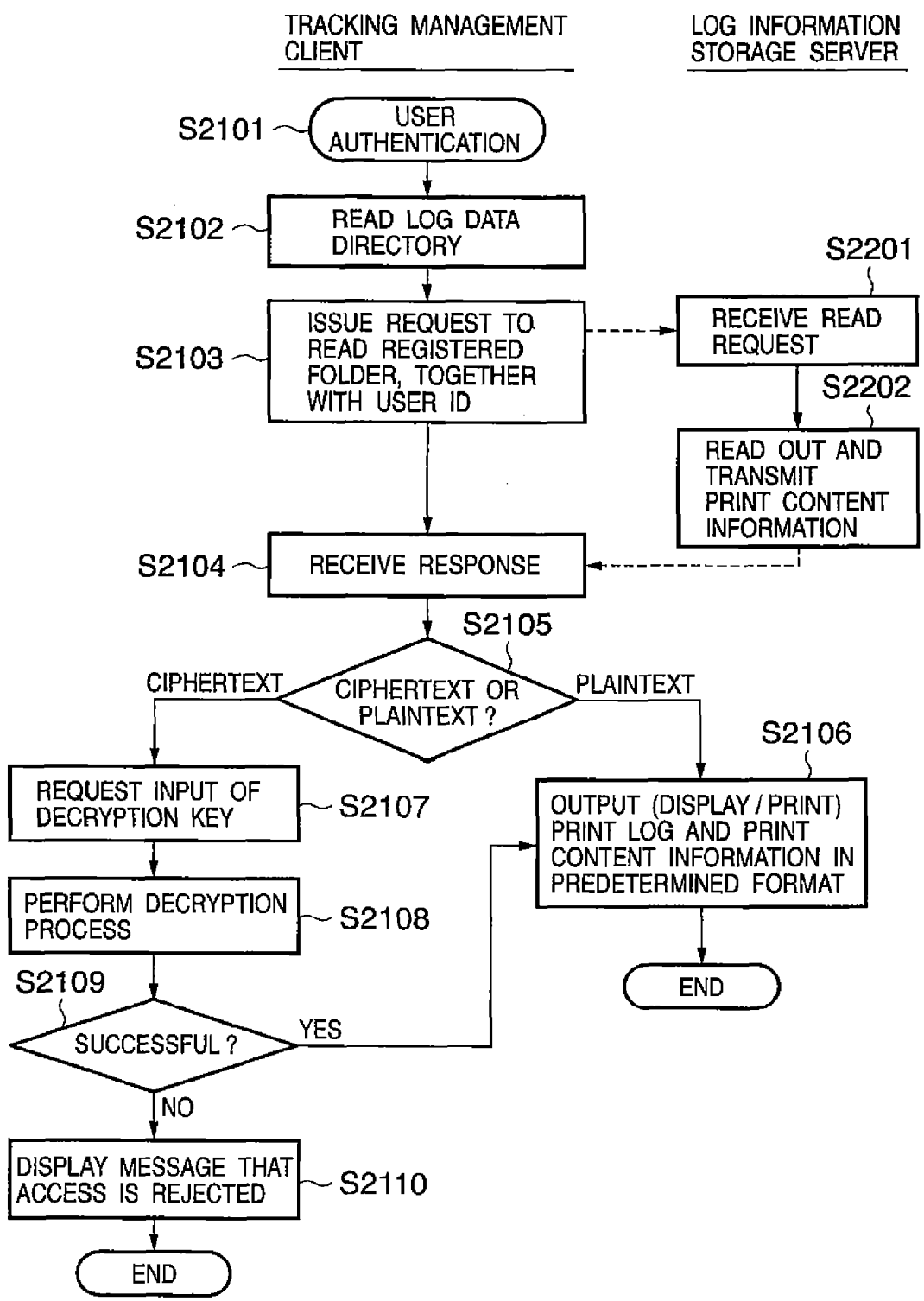

PRINTING MANAGEMENT SYSTEM AND PRINTING MANAGEMENT METHOD

CROSS-REFERENCE TO RELATED APPLICATION

This application is a continuation of application Ser. No. 11/555,772, filed Nov. 2, 2006, the entire disclosure of which is hereby incorporated by reference.

BACKGROUND OF THE INVENTION

1. Field of the Invention

The present invention relates to a printing management system and printing management method in a computer system having an information processing apparatus (e.g., a personal computer) and a printing apparatus (e.g., a printer) and, more particularly, to a printing management system and printing management method which prevent information leakage by accumulating contents printed by the printing apparatus and tracking the flow of print data.

2. Description of the Related Art

As a conventional measure against leakage of information saved in computers, there is widely used a method of setting an access right to confidential information or a storage server which stores it, and limiting users who can access the confidential information. However, most of the recent information leakage cases are intentional inside jobs by persons permitted to access confidential information.

Information which is small in amount but important in content should be protected from leakage, in addition to an enormous amount of information typified by customer information of an enterprise. Such a small amount of information can be easily brought out as a printed material. For example, a person with an access right to given information may bring it out by printing.

In this situation, demands have arisen for a measure to prevent leakage of data saved in computers in the form of a printed material. For this purpose, many measures have been proposed as follows.

(1) Print permission information is set for a document to be printed or print data, and referred to in printing (see, e.g., Japanese Patent Application Laid-Open No. 2004-252784).

(2) A user is authenticated to use a device connected to a network (see, e.g., Japanese Patent Application Laid-Open No. 2003-288327).

(3) A print server saves print data in a reprintable state, also acquires information such as a job name, client name, and user name, and adds a time stamp. Further, bitmap data is generated from print data, and saved as a print log(see, e.g., Japanese Patent Application Laid-Open No. 2002-149371).

(4) In addition to the above process, the printer side also acquires a print log and stores it in a server (see, e.g., Japanese Patent Application Laid-Open No. 2003-330677).

(5) Simultaneously when receiving print data from a client, a print server also receives information capable of uniquely specifying a user, generates a print log on the basis of the print data and user information, and enables searching, browsing, and reprinting (see, e.g., Japanese Patent Application Laid-Open No. 2004-118243).

Of these prior arts, the information leakage preventing methods capable of tracking information (Japanese Patent Application Laid-Open Nos. 2002-149371, 2003-330677, and 2004-118243) accumulate print logs and print contents in a format which allows searching for, browsing, and reprinting them. These methods do not consider protection of confidential information contained in accumulated print logs and print contents. An administrator (also called a system administrator) who manages and operates an information leakage preventing system can indirectly access confidential information through print logs and print contents accumulated in the system.

SUMMARY OF THE INVENTION

The present invention has been made to overcome the conventional drawbacks, and has as its object to provide a printing management system and printing management method capable of limiting access to accumulated log information such as print logs and print contents in a network printing system capable of accumulating printed contents and tracking the source of a printing process request.

In order to achieve the above object, the present invention comprises the following configuration.

That is, a printing system which manages a log of a print job comprises a creation unit which creates log information for specifying a print job on the basis of issued print job data, a save unit which saves the log information created by the creation unit in a save location corresponding to the log information in a storage unit, a determination unit which determines, in accordance with a request to access the log information saved in the save unit, whether to permit or reject the access request, and an access unit which reads log information subjected to the access request when the determination unit determines to permit the access request.

In order to achieve the above object, the present invention further comprises the following configuration.

That is, a program which is recorded on a computer-readable recording medium and causes a computer to execute a method of managing a log of a print job, the method comprises a creation step of creating log information for specifying a print job on the basis of issued print job data a save step of saving the log information created in the creation step in a save location corresponding to the log information in a storage unit; and an access step of reading log information subjected to an access request when the request to access the log information saved in the save step is permitted.

In order to achieve the above object, the present invention further comprises the following configuration.

That is, a printing management method of managing a log of a print job comprises a creation step of creating log information for specifying a print job on the basis of issued print job data a save step of saving the log information created in the creation step in a save location corresponding to the log information in a storage unit a determination step of determining, in accordance with a request to access the log information saved in the saving step, whether to permit or reject the access request and an access step of reading log information subjected to the access request when the access request is determined in the determination step to be permitted.

In order to achieve the above object, the present invention further comprises the following configuration.

That is, a printing system which manages a log of a print job comprises a print job issued from a user who prints a printer which prints the print job a log information creation unit which creates log information for specifying the print job on the basis of data of the print job a user identification unit which identifies, from the log information, a user who has issued the print job or a group to which the user belongs an encryption unit which encrypts the log information with a public key of the user who has issued the print job or the group to which the user belongs, in correspondence with a result of the user identification unit and a storage unit which stores the log information encrypted by the encryption unit in a predetermined storage area.

In order to achieve the above object, the present invention further comprises the following configuration.

That is, a printing method of managing a log of a print job comprises a print job issued from a user who prints a printer which prints the print job a log information creation step of creating log information for specifying the print job on the basis of data of the print job a user identification step of identifying, from the log information, a user who has issued the print job or a group to which the user belongs an encryption step of encrypting the log information with a public key of the user who has issued the print job or the group to which the user belongs, in correspondence with a result of the user identification step and a storage step of storing the log information encrypted in the encryption step in a predetermined storage area.

The present invention can limit access to accumulated log information such as print logs and print contents in a network printing system capable of accumulating printed contents and tracking the source of a printing process request.

Further features of the present invention will become apparent from the following description of exemplary embodiments (with reference to the attached drawings).

BRIEF DESCRIPTION OF THE DRAWINGS

FIG. 20 is a sequence chart when accessing log data in the first embodiment; and FIG. 21 is a sequence chart when accessing log data in the second embodiment.

DESCRIPTION OF THE EMBODIMENTS

First Embodiment

The first embodiment of the present invention will be described in detail below with reference to the accompanying drawings.

<System Configuration>

Figure 1:
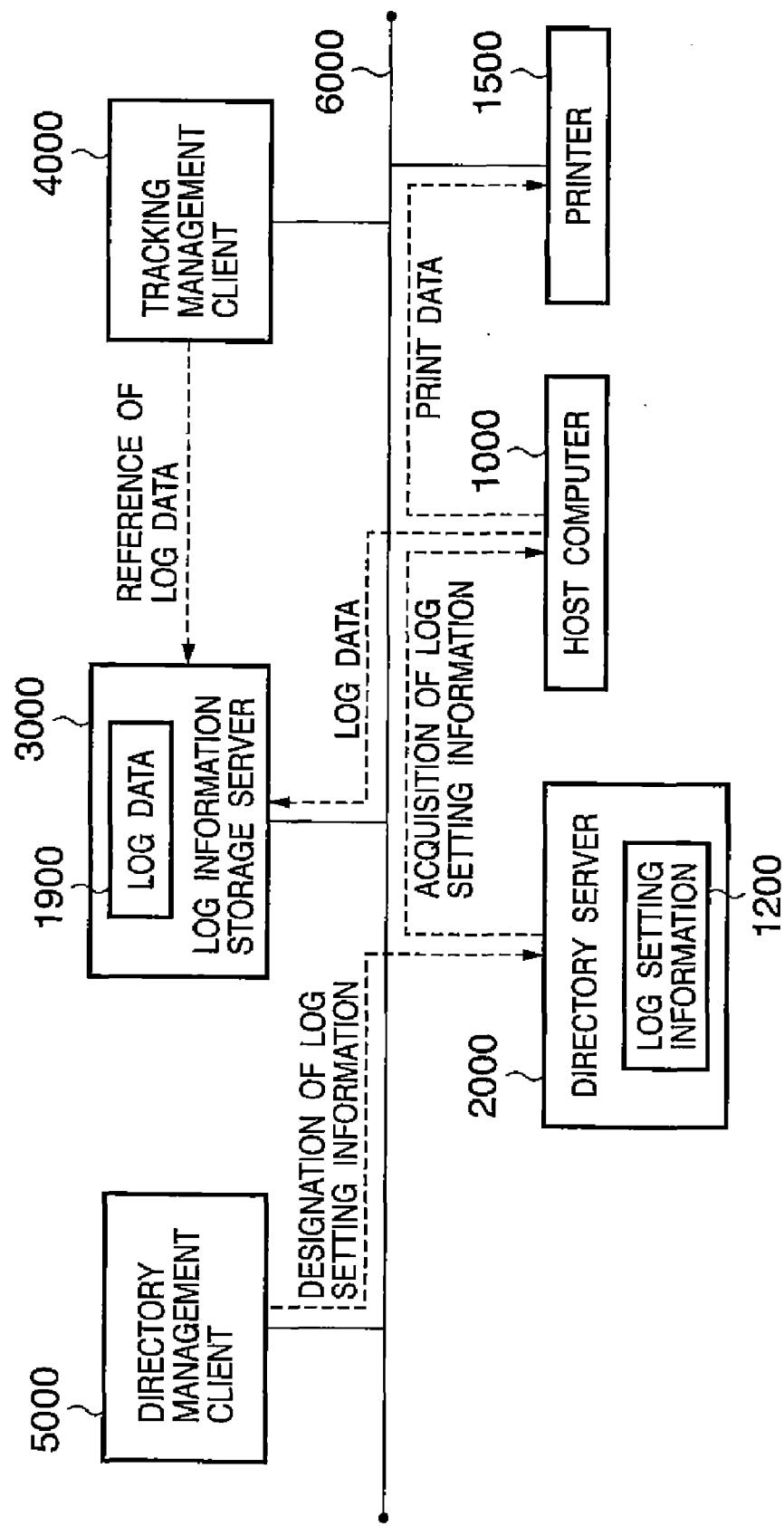
FIG. 1 is a block diagram showing the configuration of a printing system according to an embodiment of the present invention.

FIG. 1 is a block diagram showing an example of the configuration of a printing system according to the first embodiment of the present invention. The printing system includes a host computer 1000, printer 1500, directory server 2000, log information storage server 3000, tracking management client 4000, and directory management client 5000 all of which connect to a network 6000.

The host computer 1000 accepts a print request from a user, generates print data corresponding to the contents of the print request, and transmits the print data to the printer 1500. The printer 1500 executes a printing process in accordance with the received print data. The host computer 1000 connects to the directory server 2000 to acquire log setting information 1200 such as a detailed log data generation method and a log data storage destination in the log information storage server 3000. The host computer 1000 extracts and generates log data (also called tracking-data or tracking-information) 1900 complying with a print request from a user in accordance with the log setting information 1200, and transmits it to the log information storage server 3000.

The log information storage server 3000 registers and saves log data received from the host computer 1000, as a database in a storage area ensured in the log information storage server 3000 itself or another information device. The system administrator uses the tracking management client 4000 to search and browse log data registered in the database, as needed.

The directory server 2000 provides the computer system shown in FIG. 1 with directory services, and provides functions of authenticating a directory user account and managing information (properties) accessory to a user account. The authentication service starts by determining whether the directory database registers a user account after inputting authentication information such as a user ID and password. The property management service adds, deletes, updates, or provides accessory information (properties) registered in association with a user, in response to a request from an authenticated user. The directory server 2000 is implemented using, e.g., LDAP. The directory server 2000 provides directory services to at least the host computer 1000, log information storage server 3000, tracking management client 4000, and directory management client 5000. The user of the host computer 1000 executes printing with a directory account authority registered in the directory server 2000. For example, a user who logs in from the host computer 1000 is assigned with an authority which is associated with him and defined by a directory user account managed by the directory server 2000.

The directory management client 5000 inputs the log setting information 1200 to the directory server 2000. The log setting information 1200 designates the log information extraction method of each user in the host computer 1000, and the log data storage destination of each directory user in the log information storage server 3000.

The log information storage server 3000, tracking management client 4000, and directory management client 5000 may be formed from one information device or a combination of two or three identical information devices.

A directory user is a user registered in the directory. A directory user account is a user account registered in the directory.

In the first embodiment, log information is sometimes called tracking-information or user tracking-information because it is referred to in order to track a user who printed or a print job. Log information is also called tracking-data. Log information contains some contents of print data, and information capable of specifying a print job such as its attributes (e.g., the job ID and issuing date & time of a print job).

<Arrangements of Host Computer 1000 and Printer 1500>

Figure 2:
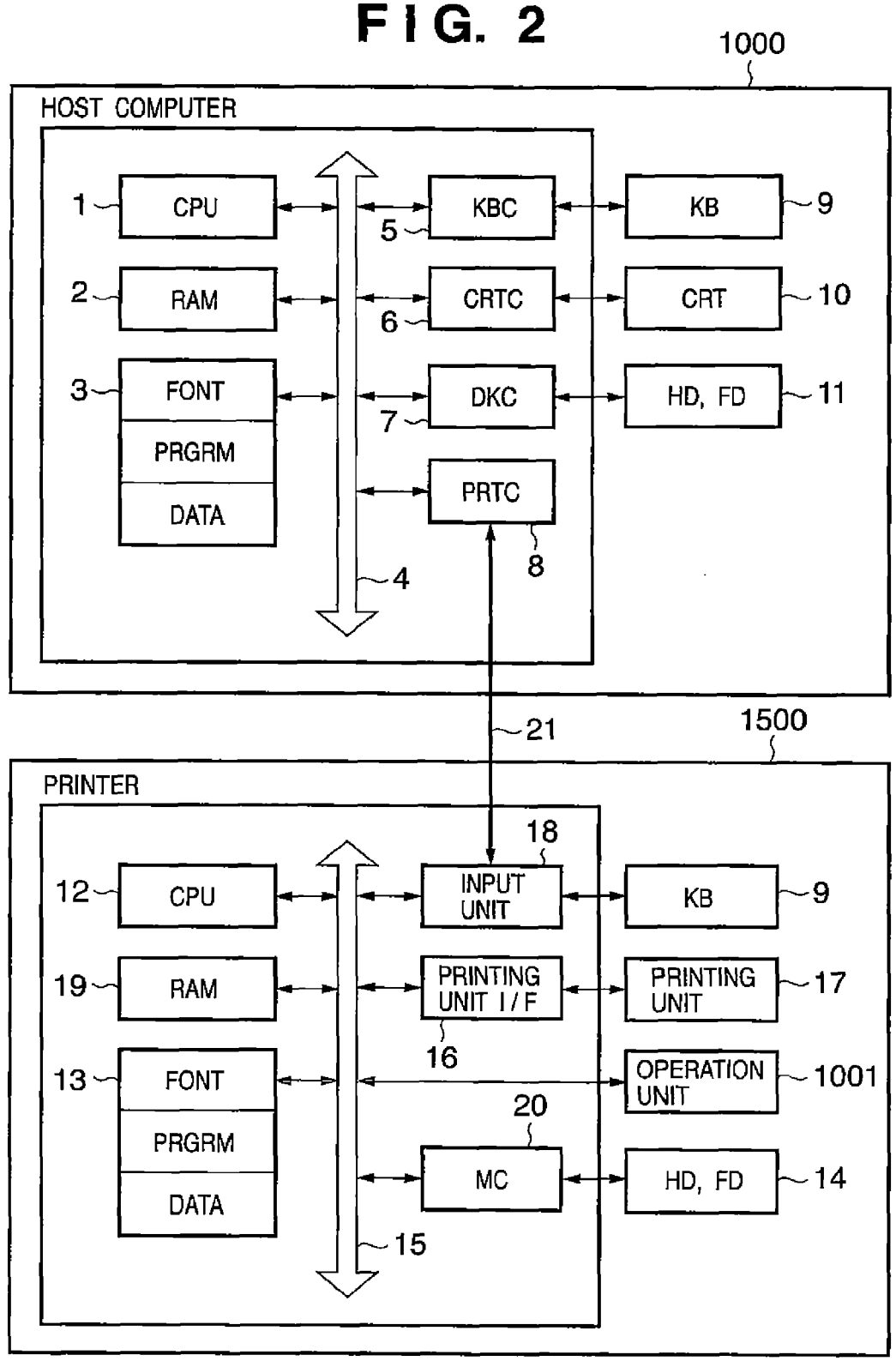
FIG. 2 is a block diagram showing the arrangements of a host computer 1000 and printer 1500 according to the embodiment of the present invention.

FIG. 2 is a block diagram showing the arrangements of the host computer 1000 and printer 1500. The present invention is applicable to a system formed from one or a plurality of devices, or a system which is connected via a network such as a LAN or WAN and performs a process, as far as the system executes the functions of the present invention.

In FIG. 2, the computer 1000 comprises a CPU 1 which controls to process a document containing a figure, image, text, table (including a spreadsheet and the like), and the like, and print on the basis of the document process in accordance with a document processing program and the like stored in the program ROM of a ROM 3 or an external memory 11. These processes include processes according to the embodiments of the present invention to be described later. The CPU 1 comprehensively controls devices connected to a system bus 4. The program ROM of the ROM 3 or the external memory 11 stores an operating system program (to be referred to as an OS hereinafter) or the like serving as a control program of the CPU 1. The font ROM of the ROM 3 or the external memory 11 stores font data and the like used in the document process. The data ROM of the ROM 3 or the external memory 11 stores various data used to perform the document process and the like. A RAM 2 functions as a main memory, work area, and the like for the CPU 1.

A keyboard controller (KBC) 5 controls a key input from a keyboard 9 or a pointing device (not shown). A CRT controller (CRTC) 6 controls display on a CRT display (CRT) 10. Reference numeral 7 denotes a disk controller (DKC). The DKC 7 controls access to the external memory 11 (e.g., a hard disk (HD) or flexible disk (FD)) which stores a boot program, various applications, font data, user files, edit files, a printer control command generation program (to be referred to as a printer driver hereinafter), and the like. The external memory of each computer also saves a directory user object table and directory group object table (these tables will be generally called a directory user (group) object table), log data, and the like. A printer controller (PRTC) 8 connects to the printer 1500 via a bidirectional interface (interface) 21, and executes a communication control process with the printer 1500.

The CPU 1 opens various windows registered in advance and executes various data processes on the basis of commands input with the mouse cursor (not shown) or the like on the CRT 10. In printing, the user opens a window associated with print settings, and can set the printer and a printing method to the printer driver including selection of the print mode.

A CPU 12 controls the printer 1500. The printer CPU 12 outputs an image signal as printout information to a printing unit (printer engine) 17 connected to a system bus 15 on the basis of, e.g., a control program stored in a ROM 13 or a control program stored in an external memory 14.

The program ROM of the ROM 13 stores a control program for the CPU 12, and the like. The font ROM of the ROM 13 stores, e.g., font data used to generate the printout information. The data ROM of the ROM 13 stores, e.g., information used in a computer when the printer does not have any external memory 14 such as a hard disk.

The CPU 12 can communicate with the computer via an input unit 18. This arrangement allows the CPU 12 to notify the computer 3000 of internal information of the printer and the like. A RAM 19 functions as a main memory, work area, and the like for the CPU 12. The RAM 19 can increase its memory capacity by an optional RAM connected to an expansion port (not shown). The RAM 19 is used as an output information expansion area, environment data storage area, NVRAM, and the like.

A memory controller (MC) 20 controls access to the external memory 14 such as a hard disk (HD) or IC card. The external memory 14 is connected as an option, and stores font data, an emulation program, form data, and the like. The input unit 18 includes a switch, LED display, and the like for operation on the operation panel.

The printer 1500 may have an NVRAM (not shown) and store printer mode setting information from an operation panel 1501.

The printing unit 17 is an electrophotographic engine in the first embodiment. The printing unit 17 finally prints data on a medium such as paper by toner dots. The printing method of the present invention is not limited to electrophotographic printing. For example, the present invention is also applicable to a printing apparatus of another type (e.g., inkjet type) which prints by forming dots.

<Arrangements of Print Processing Device and Peripheral Device in Host Computer 1000>

Figure 3:
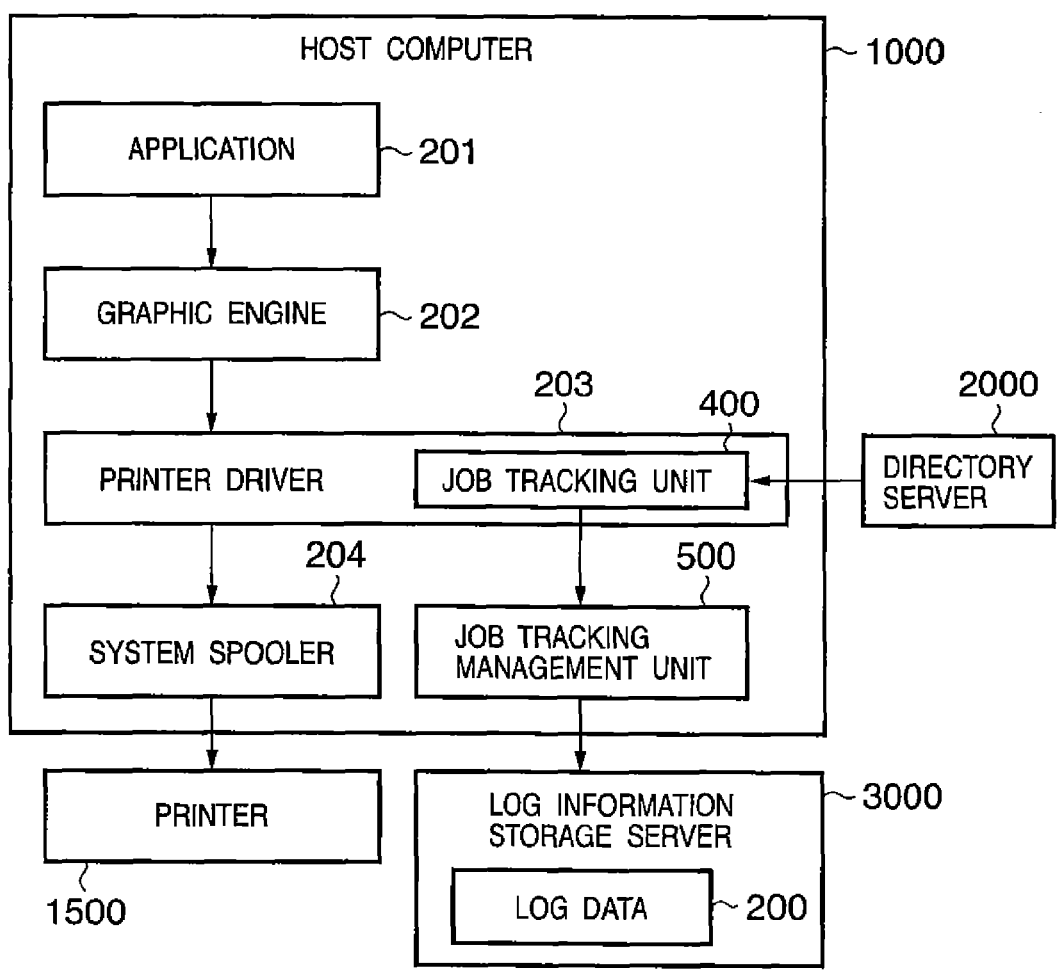
FIG. 3 is a block diagram showing an arrangement for a printing process in the host computer 1000.

The arrangements of the print processing device and peripheral device in the host computer 1000 will be described with reference to FIG. 3. FIG. 3 is a block diagram showing an example of a configuration for a printing process and information tracking in the host computer 1000 shown in FIG. 1. The host computer 1000 includes an application 201, graphic engine 202, printer driver 203, and system spooler 204 as files saved in the external memory 11. The application 201, graphic engine 202, printer driver 203, and system spooler 204 are program modules which are loaded to the RAM 2 and executed by the OS or a module that use them. In the first embodiment, the operating system is Microsoft Windows®. However, another operating system can implement the present invention.

The application 201 and printer driver 203 are addable to the FD of the external memory 11, a CD-ROM (not shown), or the HD of the external memory 11 via a network (not shown). The application 201 saved in the external memory 11 is loaded into the RAM 2 and executed. When the application 201 instructs the printer 1500 to print, the graphic engine 202 which is also loaded into the RAM 2 and becomes ready is used to output (draw) an image.

The graphic engine 202 loads, from the external memory 11 to the RAM 2, the printer driver 203 prepared for each printing apparatus such as a printer. The graphic engine 202 sets an output from the application 201 in the printer driver 203. The graphic engine 202 converts a GDI (Graphic Device Interface) function received from the application 201 into a DDI (Device Driver Interface) function, and outputs the DDI function to the printer driver 203. The printer driver 203 generates a control command, e.g., PDL (Page Description Language) recognizable by the printer on the basis of the DDI function received from the graphic engine 202. The generated printer control command passes through the system spooler 204 loaded into the RAM 2 by the OS, and then is output as print data to the printer 1500 via the interface 21.

The printing system according to the first embodiment comprises a job tracking unit 400 in the printer driver 203. The job tracking unit 400 may be a built-in module of the printer driver 203 or a library module added by individual installation.

The printer driver 203 which has been executed for printing loads the job tracking unit 400. The job tracking unit 400 which has been loaded connects to the directory server 2000. By using, as a key, account information of a user who prints with the host computer 1000, the job tracking unit 400 acquires, from the directory server 2000, the log setting information 1200 containing a detailed log information generation method and a log information storage destination in the log information storage server 3000. These procedures will be described with reference to FIG. 13 and the like.

The job tracking unit 400 extracts and generates the log data 1900 in accordance with the acquired log setting information 1200, and sends the log data 1900 to a job tracking management unit 500. The log data contains two data: a print log and print contents. The print log is information on a print job, and contains, e.g., an output printer name, output computer name, IP address, user name, print job name, print application name, and printing date & time. In this manner, the print log contains information (terminal name and address, user name, application name, and date & time) on issuing of a print job, information (printer name and date & time) on execution of the print job, and information (print job name) for identifying the print job. Print contents are information representing the contents of printing obtained by analyzing and processing a drawing instruction sent to the printer driver. For example, the print contents are an extracted text obtained by analyzing a text drawing instruction to extract text data, and an extracted image obtained by converting a page image into image data at a desired resolution.

Figure 19:
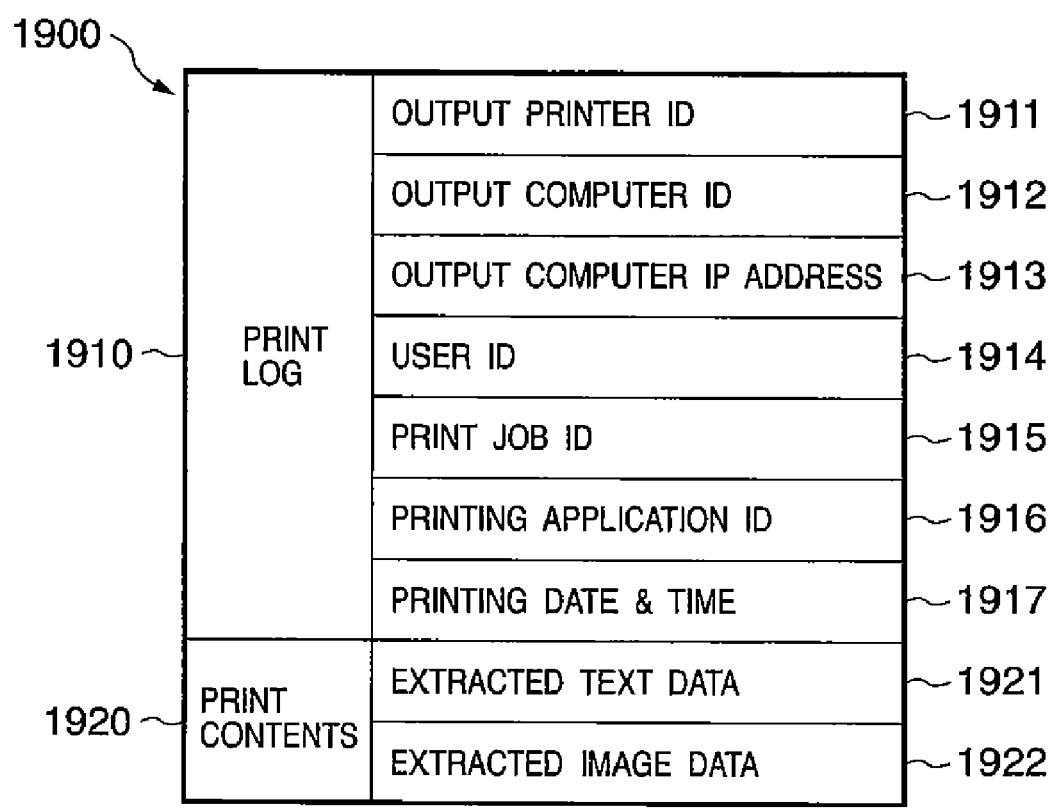
FIG. 19 is a view showing the structure of log data.

FIG. 19 shows an example of the structure of the log data 1900. Print log information 1910 contains an output printer name (ID) 1911, output computer name (ID) 1912, IP address 1913, user name (ID) 1914, print job name (ID) 1915, printing application name (ID) 1916, and printing date & time 1917, as described above. Print content information 1920 contains extracted text data 1921 and extracted image data 1922. The print log information 1910 and print content information 1920 may be saved together, as shown in FIG. 19, or separately. For example, a print job ID can be assigned to the print log and print contents to make them correspond to each other. Hence, even if the print log information 1910 and print content information 1920 are saved separately, their identity can be maintained. The reason why the print log information 1910 and print content information 1920 are saved separately is that a general system administrator is permitted to access the print log information 1910, but only a specific system administrator is permitted to access the print content information 1920 depending on the contents.

The job tracking management unit 500 receives the log data 1900, and transfers it to the log information storage server 3000. Simultaneously when receiving the log data 1900, the job tracking management unit 500 may transmit it to the log information storage server 3000, or may temporarily store it in a storage area such as a hard disk and transmit it to the log information storage server 3000 in accordance with a separately designated schedule of transmission to the log information accumulation unit. In FIG. 1, the log information storage server 3000 accumulates the log data 1900.

The arrangements of the print processing device and information tracking device in the host computer 1000 have been described.

<Designation of Log Generation Method in Directory Management Client>

Figure 4:
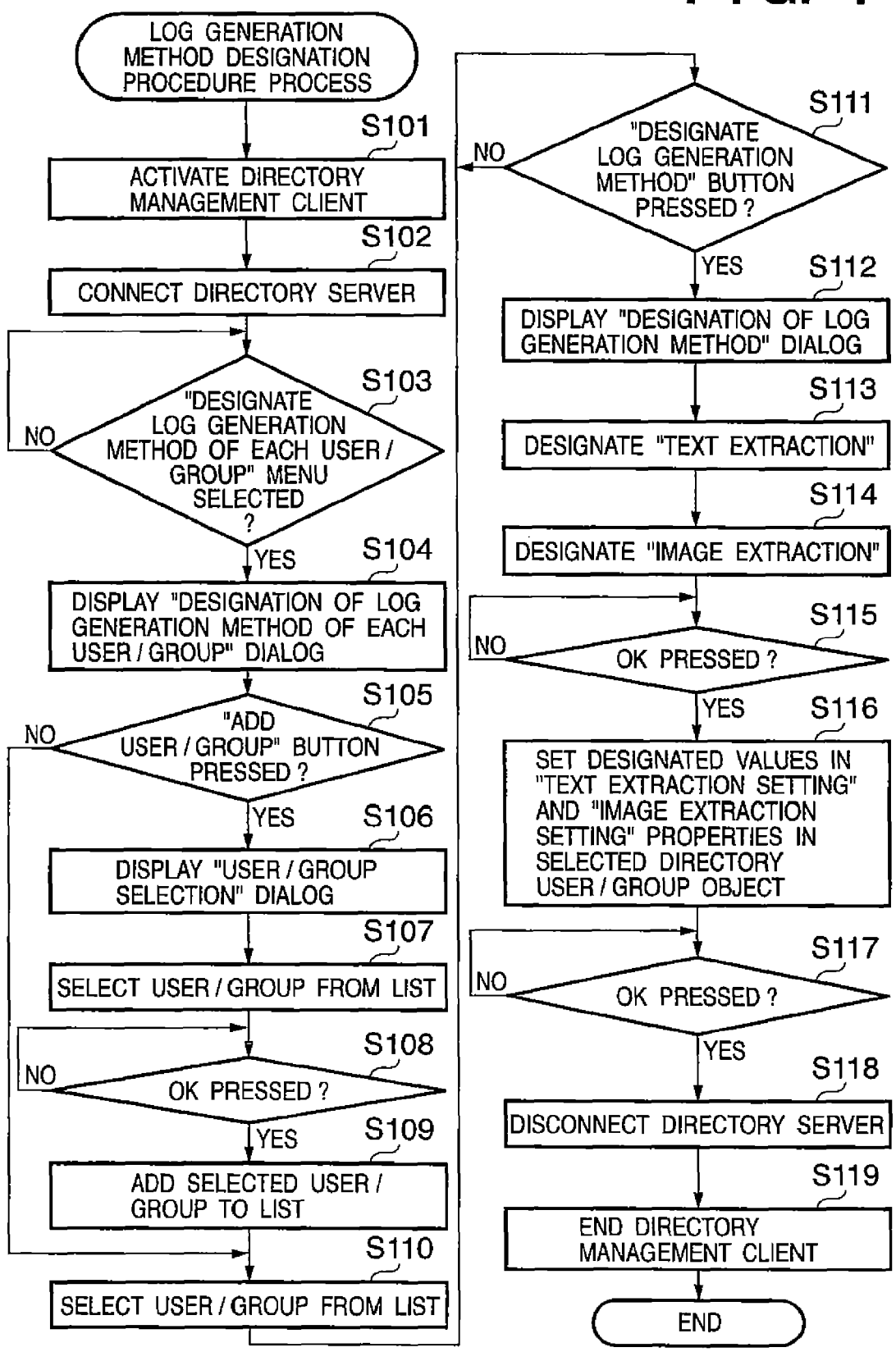
FIG. 4 is a flowchart showing a process to designate the log generation method for each user/group in a directory management client 5000.
Figure 5:
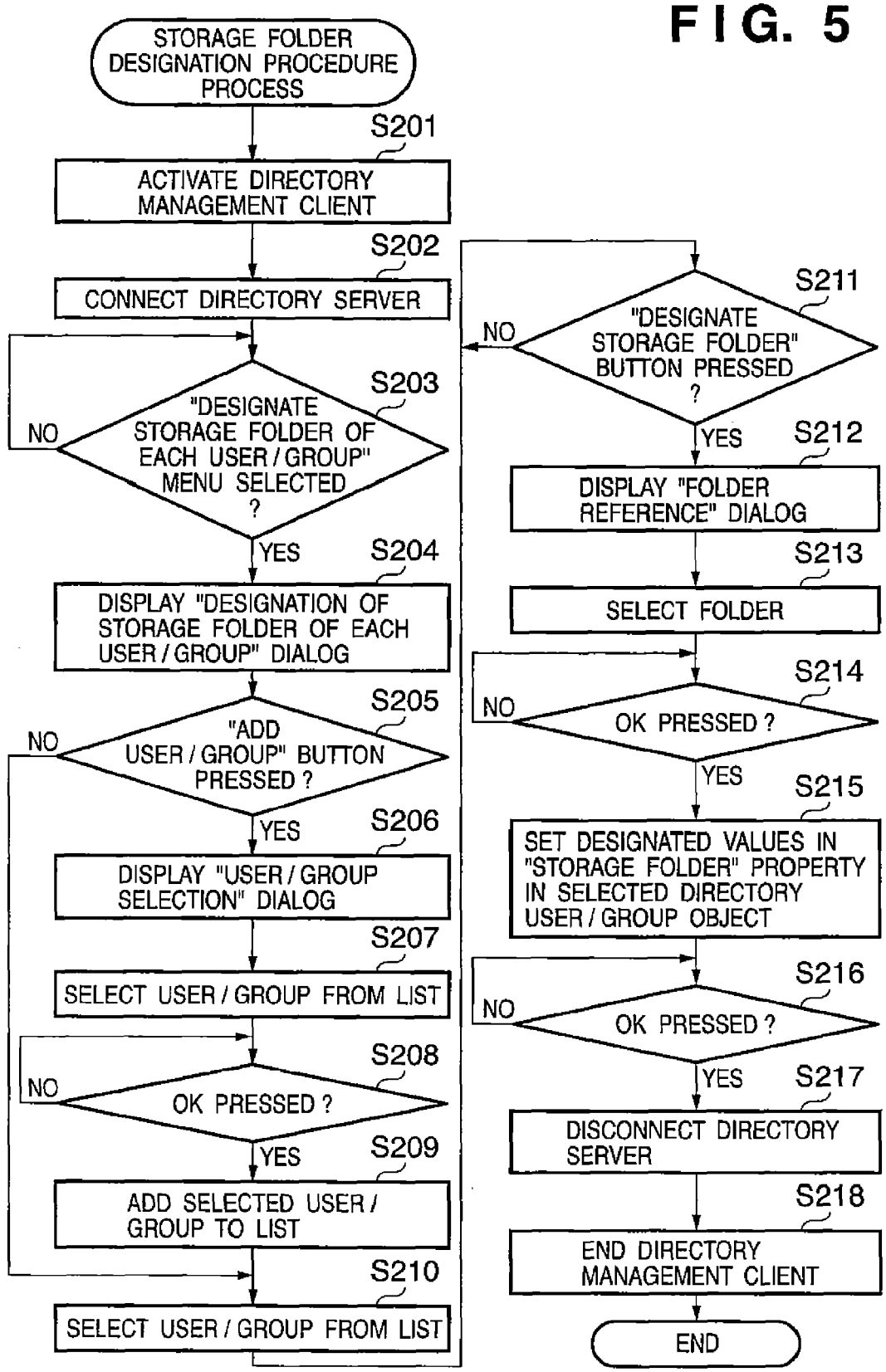
FIG. 5 is a flowchart showing a process to designate the storage folder for each user/group in the directory management client 5000.

FIG. 4 is a flowchart for explaining process procedures to designate the log generation method of each user/group in the directory management client 5000. FIG. 5 is a flowchart showing process procedures to designate the storage folder of each user/group in the directory management client 5000. FIGS. 6 to 10 are views showing user interfaces of a directory management client application for executing these processes. The "user/group" means a user or group in the first embodiment. This is because an account managed by the directory server 2000 is that for a user or group. In the following description, "user" instead of "user/group" also includes a group. A process to designate the log generation method of each user/group will be explained with reference to FIG. 4.

Figure 6:
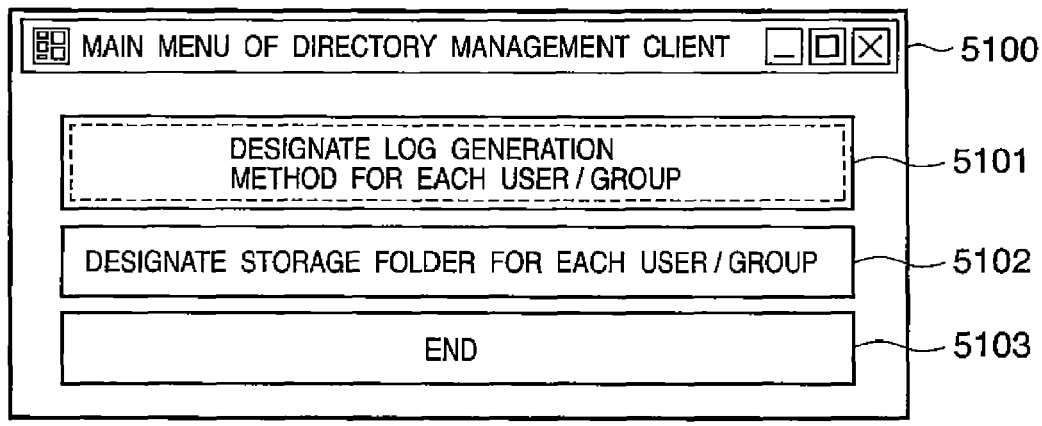
FIG. 6 is a view showing an example of the user interface of the main menu dialog of the directory management client.

In step S101, the directory management client application starts up to display a main menu dialog 5100 shown in FIG. 6. It is also possible to adopt an authentication function of authenticating a user by prompting him to input a user name and password upon activating the directory management client application, and to permit only a senior administrator to operate the application.

In step S102, the directory management client application connects to the directory server 2000. By connecting to the directory server 2000, the directory management client application can utilize directory services to acquire, e.g., directory user information.

In step S103, the directory management client application determines which of buttons 5101, 5102, and 5103 in the main menu dialog 5100 was pressed. If the user pressed the log generation method designation button 5101 for each user/group, the process advances to step S104. A process when the user pressed the storage folder designation button 5102 for each user/group will be described with reference to FIG. 5. If the user pressed the end button 5103, the directory management client application ends.

Figure 7:
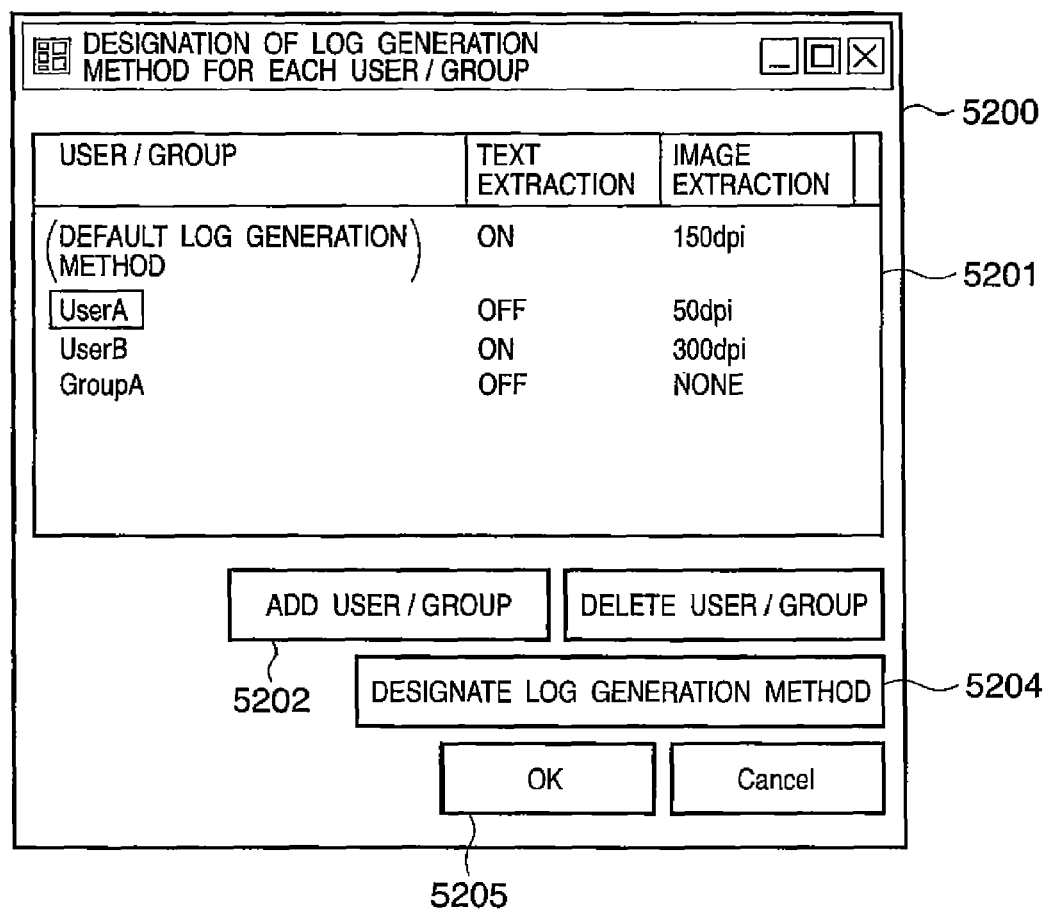
FIG. 7 is a view showing an example of the user interface of a log generation method designation dialog for each user/group.

In step S104, the directory management client application displays a log generation method designation dialog 5200 for each user/group shown in FIG. 7. The administrator uses the user interface of the dialog 5200 to designate the detailed print log generation method and print content extraction method of each directory user or group.

In step S105, the directory management client application determines whether the user pressed a user/group addition button 5202. If the user pressed the user/group addition button 5202, the process advances to step S106; if he did not press it, to step S110. If the user pressed the user/group addition button 5202, the directory management client application displays a user/group selection dialog 5400 shown in FIG. 9 in step S106. A list 5401 in the dialog 5400 holds users and groups registered in directory services.

In step S107, the user selects a user/group whose print log generation method and print content extraction method are to be changed.

In step S108, the directory management client application determines whether the user pressed an OK button 5405. If the user pressed the OK button 5405, the process advances to step S109.

In step S109, the directory management client application adds the user/group selected in step S107 to a list 5201. This list holds users/groups whose print log generation methods and print content extraction methods have been changed or are to be changed. The list also displays information on text and image extraction methods.

In step S110, the user selects a user/group to be changed from the list 5201. If the user exceptionally selects (default log generation method) as a user/group, he can designate a log generation method and print content extraction method for users except for those held in the list 5201.

In step S111, the directory management client application determines whether the user pressed a log generation method designation button 5204. If the user pressed the log generation method designation button 5204, the process advances to step S112.

Figure 10:
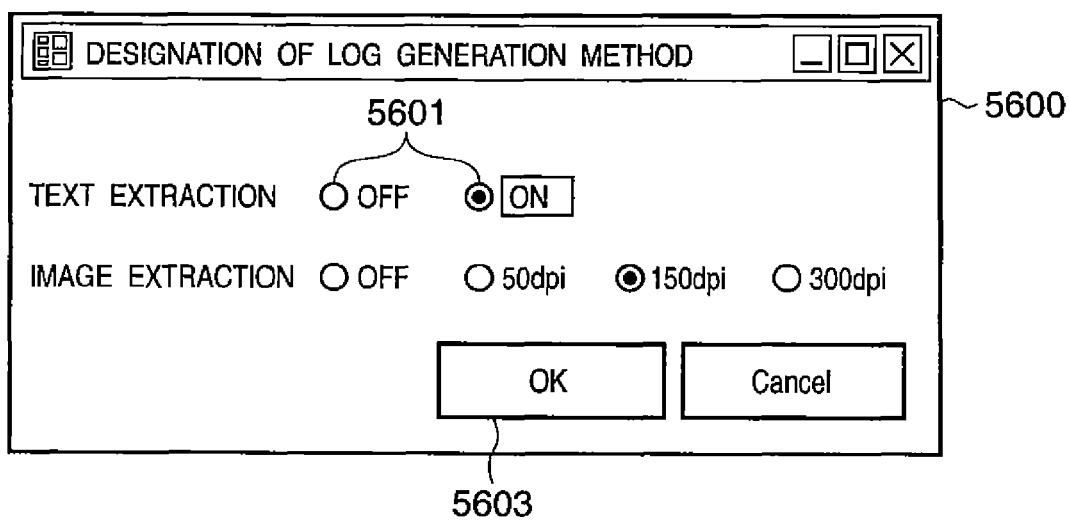
FIG. 10 is a view showing an example of the user interface of a log generation method designation dialog.

In step S112, the directory management client application displays a log generation method designation dialog 5600 shown in FIG. 10. The dialog 5600 allows properly changing a print content extraction method such as a text extraction method or image extraction method to control confidential information contained in tracking data of a specific user or group and to prevent leakage of confidential information.

In this case, only the print content extraction method is described. It is also possible to prompt a user to select whether to contain even information corresponding to confidential information, such as a print document name and printing application name contained in a print log.

In step S113, the user operates a radio button 5601 to select "ON" or "OFF" of text extraction. In step S114, the user can select image extraction "OFF" designation, or when extracting an image, select the resolution of the image file from "50 dpi", "150 dpi", and "300 dpi". Steps S113 and S114 are operations by the user, and the computer accepts and saves inputs from the user. The order of steps S113 and S114 can be changed.

In step S115, the directory management client application determines whether the user pressed an OK button 5603. If the user pressed the OK button 5603, the process advances to step S116.

In step S116, the directory management client application searches for a directory user (group) object in directory services that corresponds to the user/group selected in step S110. The directory management client application sets the values designated in steps S112 and S113 as the values of properties "text extraction setting" and "image extraction setting" expanded in advance for the object. The directory user (group) object is a set of data containing the attributes and account information of users or groups registered in the directory. An object for a user is called a directory user object, and that for a group is called a directory group object. In the first embodiment, the directory user object and directory group object are called a directory user (group) object at once.

Figure 12:
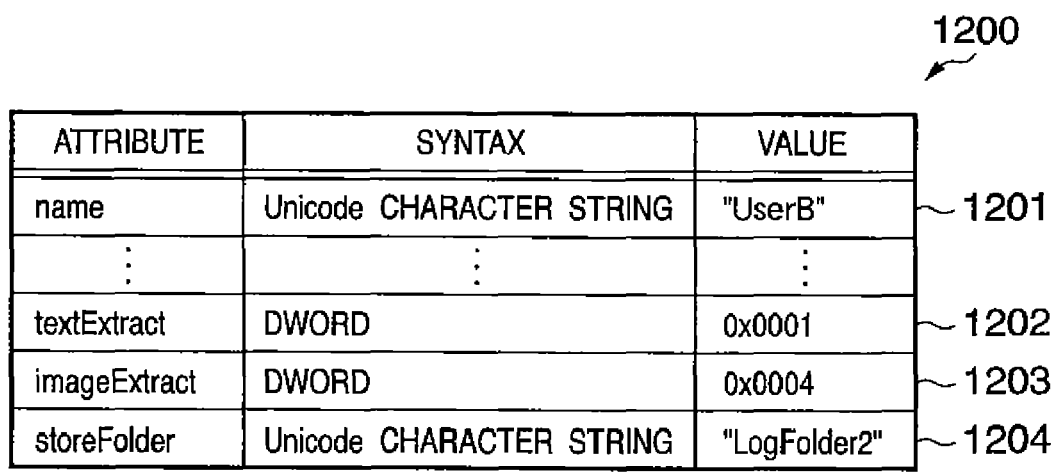
FIG. 12 is a table showing an example of a directory user (group) object table.

The properties of an expanded directory user (group) object will be explained with reference to FIG. 12. FIG. 12 shows an example of the property table of the directory user (group) object in directory services. The property table has "attribute", "syntax", and "value" as items. As concrete entries, the property table has a plurality of properties representing object properties, such as "name", "Unicode character string", and "User B" for a user (or group) name. The property table defines standard properties in advance, and they can also be expanded to add unique properties as entries. As expanded properties, the present invention adds "text extraction setting", "image extraction setting", and the like.

For example, the directory user (group) object has a property "textExtract" 1202 representing "text extraction setting". As the value of the property "textExtract" 1202, "0x0001 (=text extraction)" or "0x0000 (=no text extraction)" is set. The directory user (group) object has a property "imageExtract" 1203 representing "image extraction setting". As the value of the property "imageExtract" 1203, for example, "0x0004 (=300 dpi)", "0x0002 (=150 dpi)", "0x0001 (=50 dpi)", or "0x0000 (=no image extraction)" is set. The directory user (group) object has a property "storeFolder" 1204 representing the storage folder of the log data 1900. As the value of the property "storeFolder" 1204, for example, a folder name "LogFolder2" is set. The property "storeFolder" 1204 is not limited to the folder name, and a URI or the like is also settable. In this manner, desired log setting information can be stored by setting an expanded property value for a user (group object) in directory services.

Setting a value in the properties of a directory user (group) object uses a directory service API generally provided by an operating system. In FIG. 12, reference numeral 1200 denotes a directory user (group) object. Properties used in the first embodiment are the text extraction setting property 1202, image extraction setting property 1203, and storage folder property 1204 which form log setting information. These three properties will be called the log setting information 1200.

In step S117, the directory management client application determines whether the user pressed an OK button 5205. If the user pressed the OK button 5205, the process advances to step S118.

In step S118, the directory management client application cancels connection established between the directory management client and the directory server. In step S119, the directory management client application ends.

Designation of the log generation method of each user/group in the directory management client has been described. The method of designating the storage folder of each user/group will be explained with reference to FIG. 5.

<Designation of Storage Folder in Directory Management Client>

In step S201, the directory management client application starts up to display the main menu dialog 5100 of the directory management client shown in FIG. 6. It is also possible to adopt an authentication function of authenticating a user by prompting him to input a user name and password upon activating the directory management client application, and to permit only a senior administrator to operate the application.

In step S202, the directory management client application connects to the directory server 2000. By connecting to the directory server 2000, the directory management client application can utilize directory services to acquire, e.g., directory user information. The process up to step S202 is the same as that up to step S102 in FIG. 4.

In step S203, the directory management client application determines which of the buttons 5101, 5102, and 5103 in the main menu dialog 5100 was pressed. If the user pressed the storage folder designation button 5102 for each user/group, the process advances to step S204. The process when the user presses the log generation method designation button 5101 for each user/group has been described with reference to FIG. 4. If the user pressed the end button 5103, the directory management client application ends. In other words, FIGS. 4 and 5 show processes branched in step S103 of FIG. 4 (i.e., step S203 of FIG. 5) in accordance with a button pressed by the user in the main menu of FIG. 6.

Figure 8:
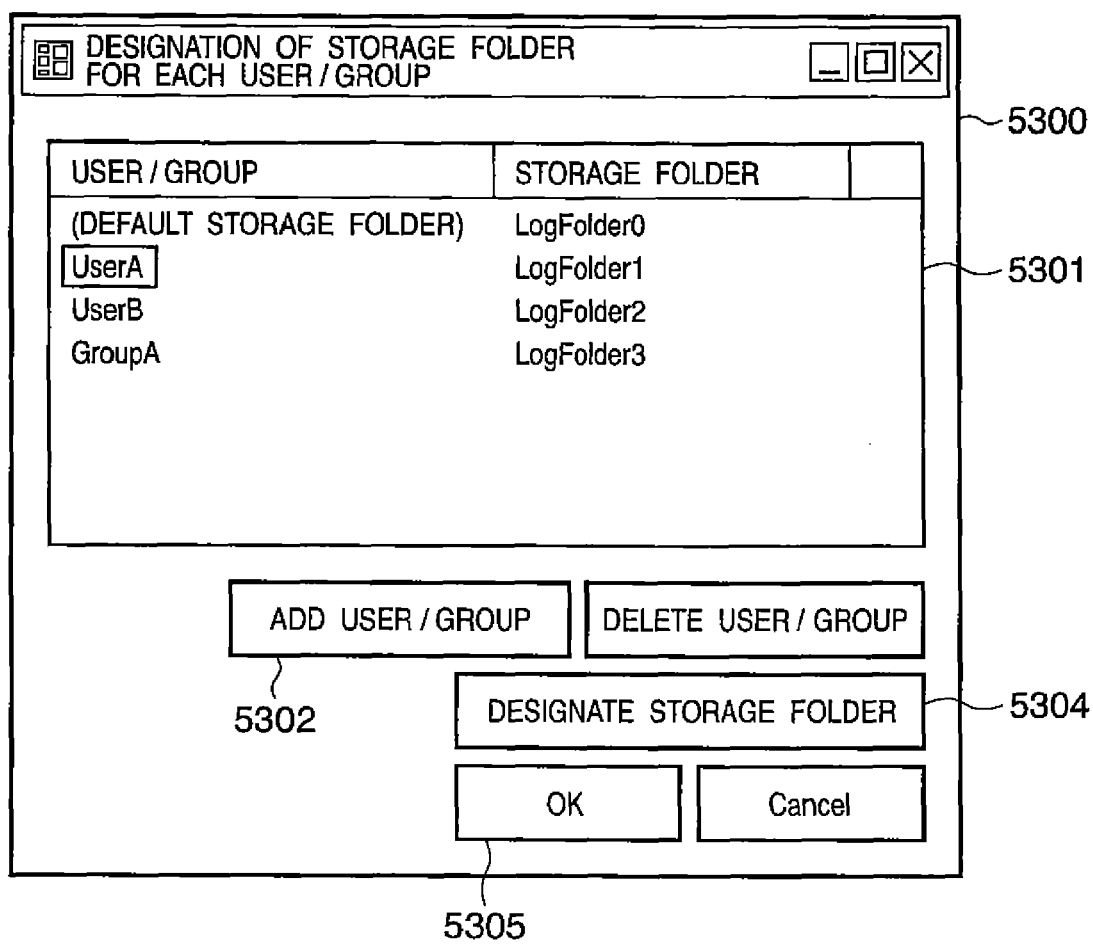
FIG. 8 is a view showing an example of the user interface of a storage folder designation dialog for each user/group.

In step S204, the directory management client application displays a storage folder designation dialog 5300 for each user/group shown in FIG. 8. The administrator uses the user interface of the dialog 5300 to designate a detailed storage location of tracking-data for each directory user or group in the log information storage server.

In step S205, the directory management client application determines whether the user pressed a user/group addition button 5302. If the user pressed the user/group addition button 5302, the process advances to step S206; if he did not press it, to step S210.

Figure 9:
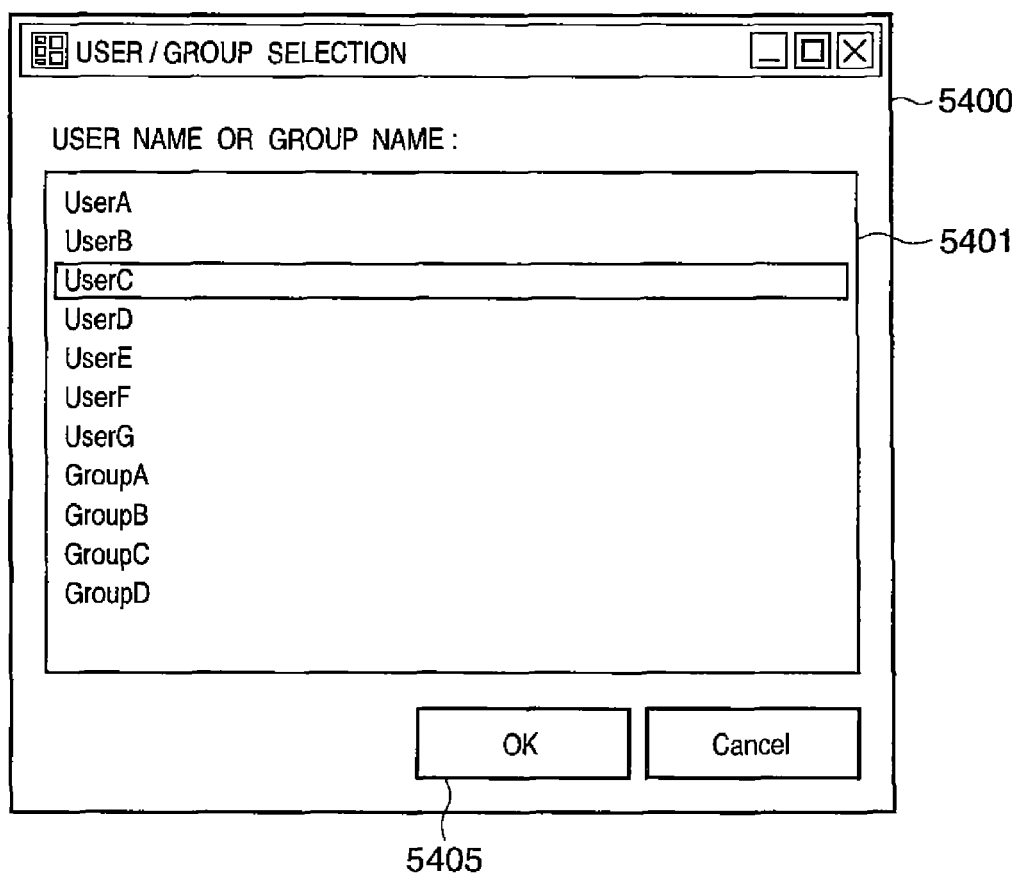
FIG. 9 is a view showing an example of the user interface of a user/group selection dialog.

If the user pressed the user/group addition button 5302, the directory management client application displays the user/group selection dialog 5400 shown in FIG. 9. The list 5401 in the dialog 5400 holds users and groups registered in directory services.

In step S207, the user selects a user/group whose detailed storage location of tracking-data in the log information storage server is to be changed.

In step S208, the directory management client application determines whether the user pressed the OK button 5405. If the user pressed the OK button 5405, the process advances to step S209.

In step S209, the directory management client application adds the user/group selected in step S207 to a list 5301. This list holds users/groups whose print log generation methods and print content extraction methods have been changed or are to be changed. The list also displays information on the storage destination folder.

In step S210, the user selects a user/group to be changed from the list 5301. If the user exceptionally selects (default storage folder) as a user/group, he can designate a storage folder for users except for those held in the list 5301.

In step S211, the directory management client application determines whether the user pressed a storage folder designation button 5304. If the user pressed the storage folder designation button 5304, the process advances to step S212.

Figure 11:
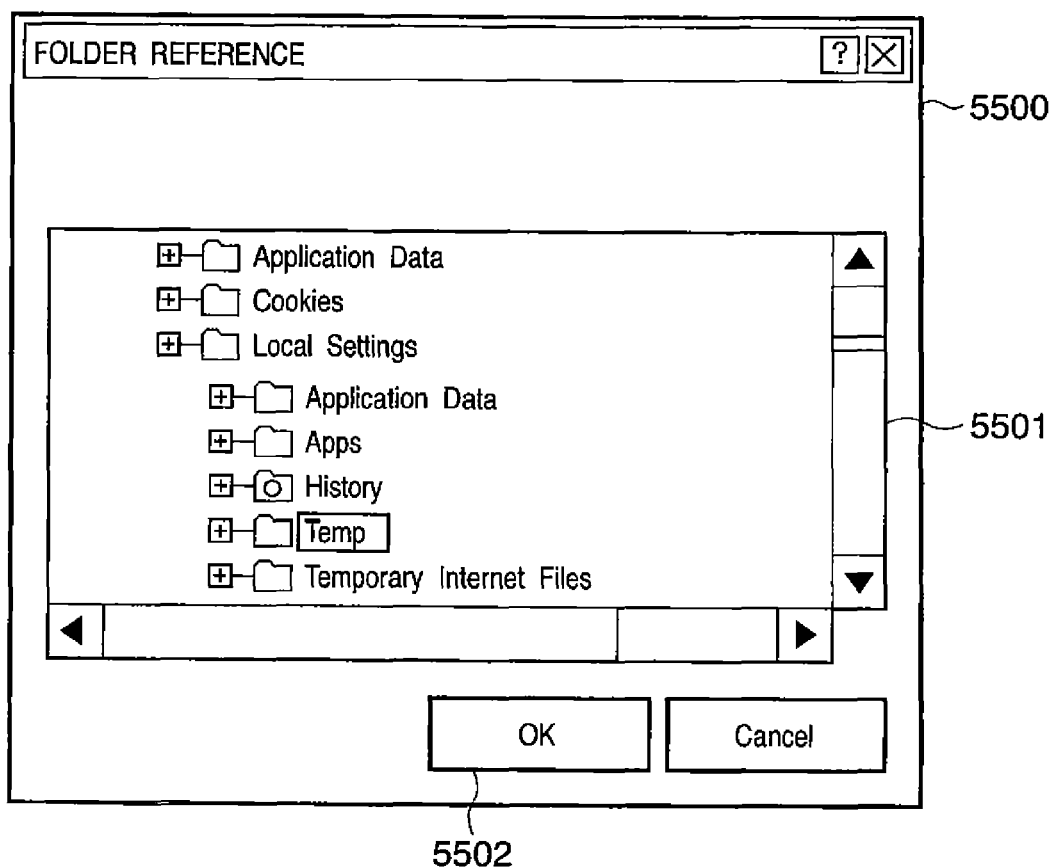
FIG. 11 is a view showing an example of the user interface of a folder reference dialog.

In step S212, the directory management client application displays a folder reference dialog 5500 shown in FIG. 11. The dialog 5500 allows designating which of virtual folders in the database is to register tracking-data when registering and saving tracking-data as a database in the log information storage server 3000. An access limitation is set in each folder to prevent a user from accessing the folder unless he has a predetermined access right. As an example of the setting method, the right to access a default folder is assigned to both a general system administrator and senior administrator, but the right to access another designated folder is assigned to only the senior administrator. In other words, the access limitation on a default folder permits a system administrator to access the default folder, and inhibits other users from accessing it. The access limitation on another user storage folder permits only a senior administrator to access the user storage folder, and inhibits other users from accessing it. In this manner, leakage of confidential information can be prevented by distributing tracking-data to folders in the access-limited database. Access limitation information (e.g., the IDs of an access-permitted user and administrator) are set and held as property information for each folder. The access limitation on the folder is the same as an access limitation function provided by a general operating system, and a description thereof will be omitted.

In step S213, the user operates a tree view 5501 to select a folder.

In step S214, the directory management client application determines whether the user pressed an OK button 5502. If the user pressed the OK button 5502, the process advances to step S215.

In step S215, the directory management client application searches for a directory user (group) object in directory services that corresponds to the user/group selected in step S210. The directory management client application sets the value designated in step S212 as the value of a property "storage folder" expanded in advance for the object.

For example, when there is a property "storeFolder" representing "storage folder", a folder, e.g., "LogFolder1" selected by the user is set. In this fashion, desired log setting information can be stored by setting an expanded property value for a user (group object) in directory services. Setting a value in the properties of a directory user (group) object uses a directory service API generally provided by an operating system.

In step S216, the directory management client application determines whether the user pressed an OK button 5305. If the user pressed the OK button 5305, the process advances to step S217.

In step S217, the directory management client application cancels connection established between the directory management client and the directory server. In step S218, the directory management client application ends.

The log storage folder designation method for each user/group in the directory management client has been described.

<Description of Process in Job Tracking Unit 400>

Process procedures to generate and transmit log data in the printer driver 203 and job tracking unit 400 will be explained with reference to FIG. 13. In step S301, the printer driver 203 accumulates a print job drawing instruction from the graphic engine in the form of intermediate codes. The intermediate codes are data saved in the order of receiving information of a DDI (Device Driver Interface) drawing instruction from the graphic engine 202. The intermediate codes can take a text or binary format as far as the printer driver itself can interpret them. As an accumulation means, the drawing instruction may be temporarily saved as a file or held in the memory. The drawing instruction includes job control instructions (e.g., a job start (end) instruction and page start (end) instruction) in addition to rectangle drawing, text drawing, and line drawing. In the first embodiment, a print job means a request for a printing process defined by job control instructions such as the job start instruction and job end instruction. Print job data means instructions which form the print job, including job control instructions and drawing instructions.

In step S302, the job tracking unit 400 loads print job data accumulated in the intermediate code form, converts drawing instructions into the GDI (Graphic Driver Interface) format again in the recording order, and draws data in the graphic engine.

In step S303, the job tracking unit 400 waits for a job start instruction while issuing accumulated intermediate codes to the graphic engine. If the job tracking unit 400 receives the job start instruction, the process advances to step S304.

In step S304, the job tracking unit 400 acquires print user account information from the print job. At this time, the user desirably executes printing with the directory account authority in directory services provided by the directory server 2000; otherwise, default log setting information (i.e., log setting information defined in advance for a default user) is used to generate and transmit log data. Print user account information is acquired using an API provided by an operating system. The print user account information contains, e.g., the ID of a user who requests execution of the print job.

In step S305, the job tracking unit 400 connects to the directory server 2000.

In step S306, the job tracking unit 400 accesses the property of a directory user using the print user account acquired in step S304 as a key, and acquires log setting information 1200 associated with the user account. More specifically, the job tracking unit 400 acquires, as log setting information, the text extraction property "textExtract", image extraction property "imageExtract", and storage destination folder property "storeFolder" in the property table of FIG. 12.

In step S307, the job tracking unit 400 determines whether acquisition of the log setting information is successful. If acquisition of the log setting information is successful, the process advances to step S309; if it fails, to step S308.

In step S308, the job tracking unit 400 loads default print setting information.

In step S309, the job tracking unit 400 cancels connection established between the job tracking unit 400 and the directory server 2000.

In step S310, the job tracking unit 400 establishes connection to the job tracking management unit 500.

In step S311, the job tracking unit 400 collects and generates a job-level print log, and transfers it to the connection-established job tracking management unit 500. The job-level print log is information on a print job, and includes an output printer name, output computer name, IP address, user name, print job name, printing application name, printing date & time, and the like.

In step S312, the job tracking unit 400 adds, to log data, storage destination folder information in the log setting information acquired in step S306, and transfers the storage destination folder information. The storage destination folder information represents a detailed storage location in the log information storage server 3000. The storage destination folder information is referred to in order to save log data, but the first embodiment neither contains nor saves the storage destination folder information in the log data 1900. The storage destination folder information may be saved together with the log data 1900.

In step S313, the job tracking unit 400 waits for a page drawing start instruction while issuing accumulated intermediate codes to the graphic engine. If the job tracking unit 400 receives the page drawing start instruction, the process advances to step S314.

In step S314, the job tracking unit 400 refers to text extraction information in the log setting information acquired in step S308, extracts a text in accordance with the text extraction information, and transfers the text to the connection-established job tracking management unit 500. More specifically, the job tracking unit 400 skips text extraction when a value representing "no text extraction" is set, and executes it when a value representing "text extraction" is set. Text extraction is a process to, when an intermediate code drawing instruction issued from the job tracking unit 400 is a text drawing instruction and contains information on a text to be drawn as an instruction parameter, extract the contained text and transmit it as extracted text information. Hence, the job tracking unit 400 cannot extract text information of print characters (e.g., a rectangle, line, or bitmap image) to be drawn by a drawing instruction.

In step S315, the job tracking unit 400 refers to image extraction information in the log setting information acquired in step S308, extracts an image in accordance with the image extraction information, and transfers the image to the connection-established job tracking management unit 500. More specifically, when a value representing "no image extraction" is set, the job tracking unit 400 skips image extraction. When a value representing a resolution such as "50 dpi", "150 dpi", or "300 dpi" is set, the job tracking unit 400 generates a page image having this resolution, and converts it into a bitmap image file.

In steps S314 and S315, the job tracking unit 400 controls whether to contain extraction information of the text and image of print contents in log data. Similarly, the job tracking unit 400 can also control not to contain items (e.g., a print job name and printing application name) which are equivalent to print contents in the print log and may contain confidential information.

In step S316, the job tracking unit 400 waits for a page drawing end instruction while issuing accumulated intermediate codes to the graphic engine. If the job tracking unit 400 receives the page drawing end instruction, the process advances to step S317. If the job tracking unit 400 does not receive the page drawing end instruction, the process returns to step S314 in order to keep drawing the current page without breaking it.

In step S317, the job tracking unit 400 waits for a job end instruction while issuing accumulated intermediate codes to the graphic engine. If the job tracking unit 400 receives the job end instruction, the process advances to step S318. If the job tracking unit 400 does not receive the job end instruction, this means that the next page start instruction is to come, and the process returns to step S313.

In step S318, the job tracking unit 400 cancels connection established between the job tracking unit 400 and the job tracking management unit 500.

The log data generation/transfer process in the job tracking unit 400 has been explained.

<Description of Process in Job Tracking Management Unit>

Figure 14:
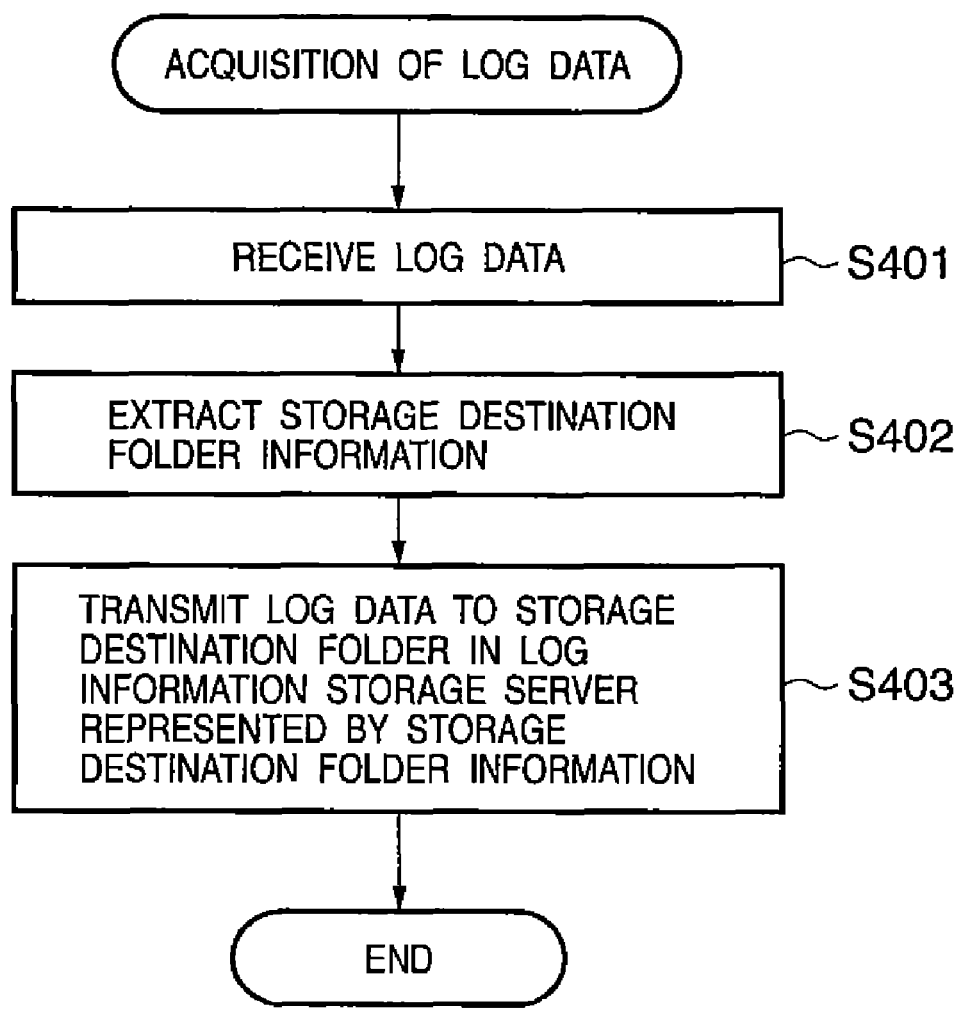
FIG. 14 is a flowchart showing a log data transfer process in a tracking management unit 500.

A log data transfer process in the job tracking management unit 500 will be described with reference to FIG. 14. In step S401, the job tracking management unit 500 starts receiving log data from the job tracking unit 400. After sequentially receiving data, connection between the job tracking management unit 500 and the job tracking unit 400 is canceled in response to the end of reception. The job tracking management unit 500 converts the log data into a file of a format capable of registering the log data in the database of the log information storage server 3000. This file is stored in a temporary storage location.

In step S402, the job tracking management unit 500 extracts storage destination folder information contained in the log data from the file temporarily stored in step S401. If the storage destination folder information cannot be extracted or does not exist, the job tracking management unit 500 designates a default storage destination folder.

In step S403, the job tracking management unit 500 transfers the log data received in step S401 to a detailed storage location in the database of the log information storage server 3000 that is represented by the storage destination folder information acquired in step S402, thereby registering the log data in the database. The log data transfer process in the job tracking management unit 500 has been described.

<Reference of Log Data Using Tracking Management Client 4000>

Figure 16:
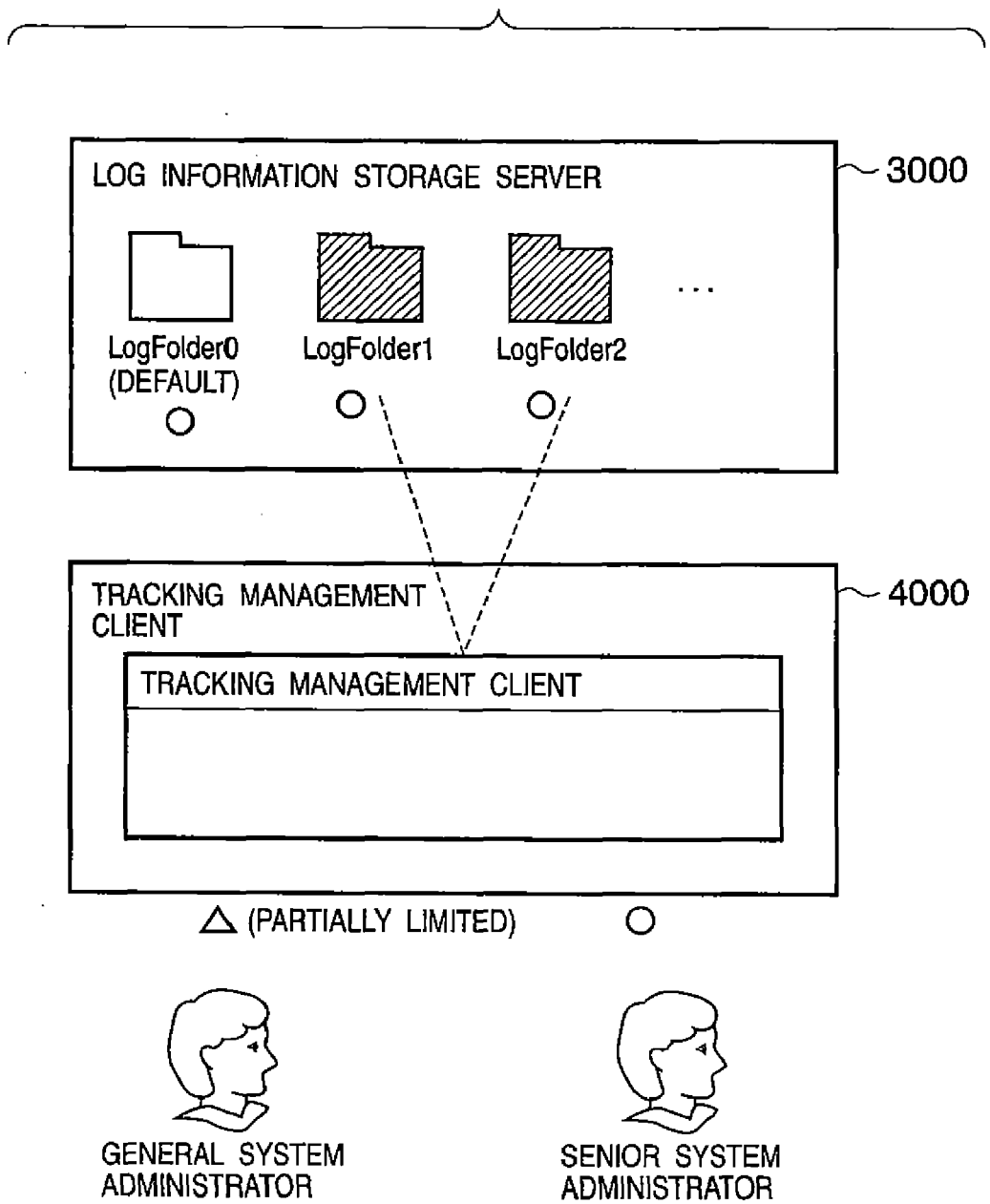
FIG. 16 is a view showing a method of referring to log data by a system administrator using a tracking management client 4000.

A method of referring to log data by a system administrator in the tracking management client will be described with reference to FIG. 16.

The log information storage server 3000 is an information device having a log data-registered database. As shown in FIG. 16, respective log data are distributed to a plurality of folders by a virtual storage method. Respective log data are distributed to folders as a result of the log data generation/transmission process by the job tracking unit 400 as shown in FIG. 13, and a series of log data transfer processes by the job tracking management unit 500 as shown in FIG. 14.

The tracking management client 4000 is an information device which allows a system administrator who manages and operates the network printing system according to the present invention, to access the database of the log information storage server 3000.

A tracking management client application for referring to the database is installed in the tracking management client 4000 and is available.

The tracking management application is executed under the authority of a directory user having an access right capable of referring to all folders in the database of the log information storage server 3000 in directory services provided by the directory server 2000. The tracking management client application has an authentication function of authenticating a user by prompting him to input a user name and password upon activating the tracking management client application. When the tracking management client application determines that its operator is a senior administrator, from authentication information (e.g., a user ID and password) input in authentication, he can access all folders in the database as a system administrator. As a result, the operator can refer to all log data in the database.

When the tracking management client application determines by authentication that its operator is a general administrator, he can refer as a general administrator to only default folders in the database, and folders for which he has an access right. The operator cannot access the remaining folders. Consequently, the operator can refer to only log data stored in some access-permitted folders. This configuration can reduce the risk of leaking confidential information by a general administrator through a print log or print contents contained in log data.

The above description does not contain procedures to specify log data accessed by a user. For example, the tracking management client 4000 refers to the storage destination folder of each user/group registered in the directory user (group) object table of the directory server 2000. The tracking management client 4000 lists all the print job names and the like of log data stored in the folder. In the list, the user designates log data to be accessed. The tracking management client 4000 accesses the designated log data, reads it out, and outputs (e.g., displays) it. List display and tracking-data access comply with the access limitation.

FIG. 20 shows an example of a sequence for referring to log data. The example of FIG. 20 represents a method different from the above-described one. According to the method in FIG. 20, the log information storage server 3000 creates log data directory information in storing log data. The directory information registers a print job ID and the file name of log data containing the name of a folder which stores log data of the print job, in association with each other. When access by a general administrator is limited, information capable of specifying each print job is registered instead of the print job name.

The tracking management client 4000 executes the tracking management application to authenticate a user on the basis of authentication information input by the user (S2001). The directory server 2000 desirably performs this authentication. The tracking management client 4000 refers to log data directory information, and displays a list of print job IDs (S2002). If access is limited, the tracking management client 4000 displays alternative data under the access limitation. The tracking management client 4000 transmits, to the log information storage server 3000, a request to access (read) a folder which saves log data of a print job selected by the user (S2003). The tracking management client 4000 simultaneously transmits authentication information such as a user ID.

The log information storage server 3000 receives the access request (S2011). The log information storage server 3000 determines, on the basis of the authentication information (e.g., the user ID) contained in the request, whether the user has a right to access the designated folder (S2012). If the user has the access right, the log information storage server 3000 reads the designated log data from the designated folder, and transmits it to the tracking management client 4000 (S2013). If the user does not have any access right, the log information storage server 3000 transmits, to the tracking management client 4000, a message that the log information storage server 3000 rejects access (S2014).

The tracking management client 4000 receives a response from the log information storage server 3000 (S2004), and determines whether the contents represent access rejection (S2005). For access rejection, the tracking management client 4000 displays a message to this effect (S2006). If the tracking management client 4000 has received the log data, it outputs a contained print log and content information in a predetermined format (S2007).

Reference of log data by a system administrator in the tracking management client has been described. The first embodiment can control access to log data by storing log data in a folder capable of setting an access right. For example, the first embodiment can permit only an administrator having a predetermined authority to access log data, and inhibit other administrators and general users from accessing log data. This setting can prevent access to access-limited data by a user having no access right through log data containing a print log and the like.

MODIFICATION

A log data transfer process (shown in FIG. 14 in the first embodiment) in the directory management client 5000 according to a modification to the first embodiment will be described with reference to FIG. 15.

Figure 15:
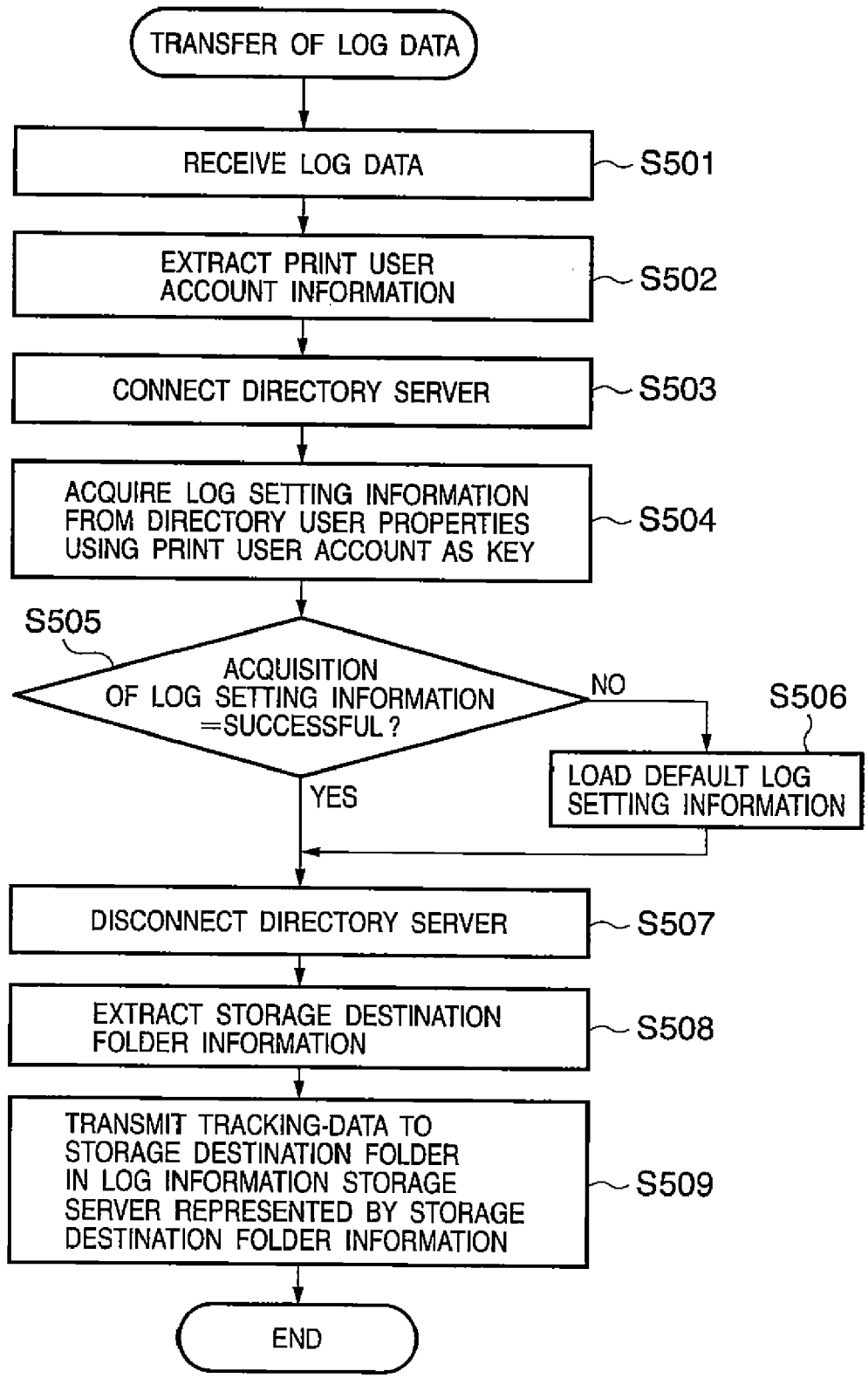
FIG. 15 is a flowchart showing a log data transfer process in the tracking management unit 500 according to a modification to the embodiment.

FIG. 15 shows process procedures in the modification when the job tracking management unit 500 executes connection to the directory server 2000 and acquisition of log setting information in steps S305 to S309 in the process by the job tracking unit described with reference to FIG. 13.

In step S501 of FIG. 15, the job tracking management unit 500 starts receiving log data from the job tracking unit 400. After sequentially receiving data, connection established between the job tracking management unit 500 and the job tracking unit 400 is canceled in response to the end of reception. The job tracking management unit 500 converts the log data into a file of a format capable of registering the log data in the database of the log information storage server 3000.

In step S502, the job tracking management unit 500 extracts print user account information contained in the print log of the log data.

In step S503, the job tracking management unit 500 connects to the directory server 2000. By connecting to the directory server 2000, the job tracking management unit 500 can acquire, e.g., directory user information by utilizing directory services through an API provided by an operating system.

In step S504, the job tracking management unit 500 searches directory services for a directory user by using the print user account name acquired in step S502 as a key. The job tracking management unit 500 acquires log setting information from expanded properties of the directory user object.

In step S505, the job tracking management unit 500 determines whether acquisition of the log setting information is successful in step S504. If the job tracking management unit 500 cannot detect a target directory user as a result of searching for the directory user using the print user account name as a key, or if log setting information registered as expanded properties cannot be acquired or does not exist, the process advances to step S506. If acquisition of the log setting information is successful, the process advances to step S507.

In step S506, the job tracking management unit 500 loads default log setting information in place of properties which cannot be acquired from the directory user object in directory services.

In step S507, the job tracking management unit 500 cancels connection established between the job tracking management unit 500 and directory services, and ends service inquiry.

In step S508, the job tracking management unit 500 extracts storage destination folder information from the log setting information acquired in step S504 or loaded in step S506.

In step S509, the job tracking management unit 500 transfers the log data received in step S501 to a detailed storage location in the database of the log information storage server 3000 that is represented by the storage destination folder information acquired in step S508, thereby registering the log data in the database.

Figure 13:
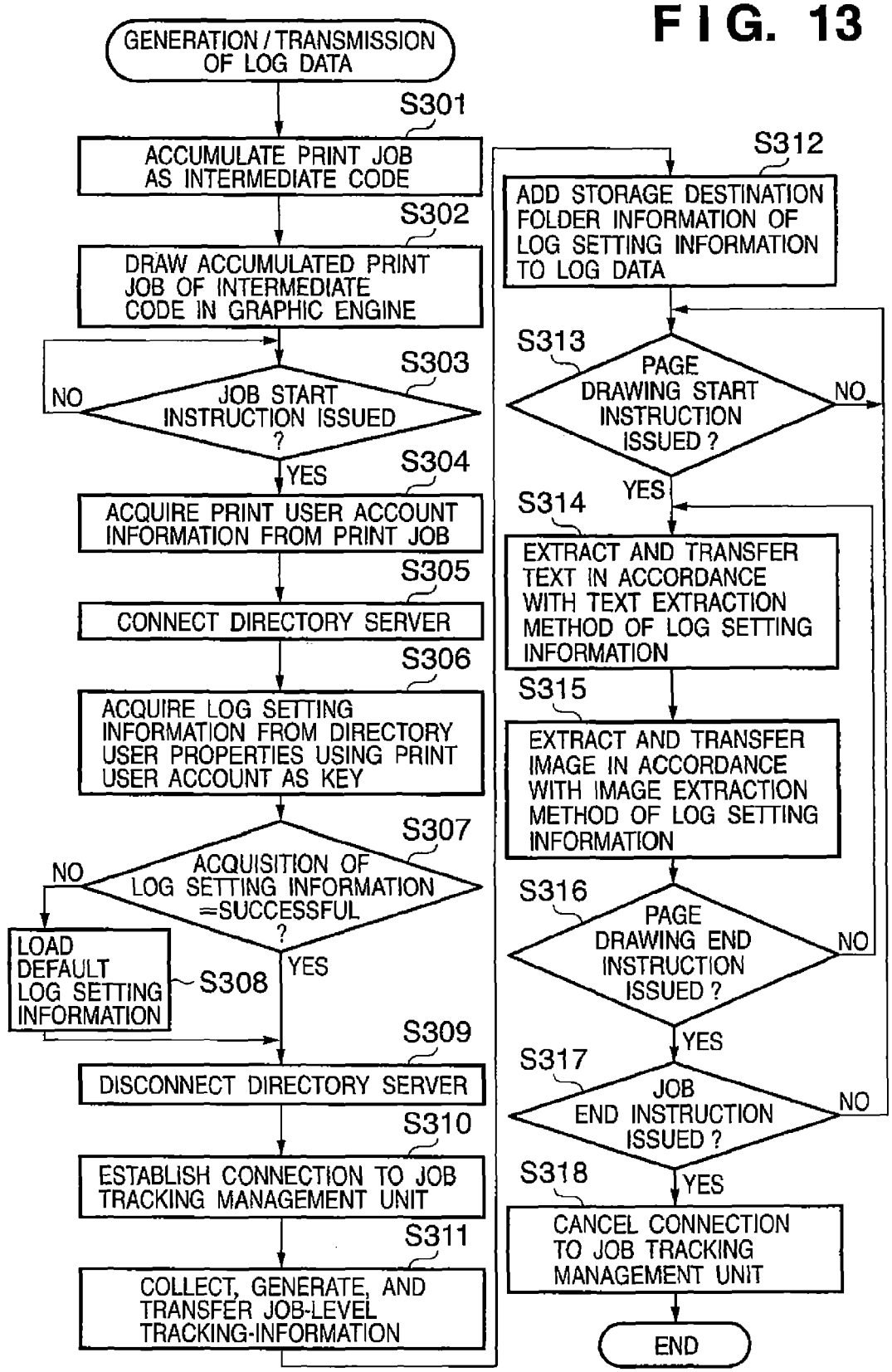
FIG. 13 is a flowchart showing a log data generation/transmission process in a job tracking unit 400.

Steps S305 to S309 in the process by the job tracking unit shown in FIG. 13 become unnecessary in the modification in which the job tracking management unit 500 executes connection to the directory server 2000 and acquisition of log setting information as shown in FIG. 15. Since steps S305 to S309 are omitted, text extraction and image extraction in steps S314 and S315 are done with default settings and cannot be changed for each user/group.

The log data transfer process in the job tracking management unit 500 according to the modification has been described. Also in this modification, the access limitation function operates similarly to the first embodiment, except for the above-mentioned limitation. The modification can obtain the same effects.

The modification is useful when an administrator permitted to access log data accesses print job log information containing confidential data, tracks the issuing source and contents, and specifies the route of confidential information leakage.

Second Embodiment

A log data encryption process according to the second embodiment will be described. The second embodiment limits access to log data by encrypting it. The system configuration is the same as those shown in FIGS. 1 and 2. The second embodiment adopts the same directory user (group) object table, especially log setting information 1200, and the log data structure in FIG. 10, as those of the first embodiment. The second embodiment also employs the same processes as those in FIGS. 4, 5, and 13 in the first embodiment.

<Log Data Encryption Process by Job Tracking Management Unit 500>

Figure 17:
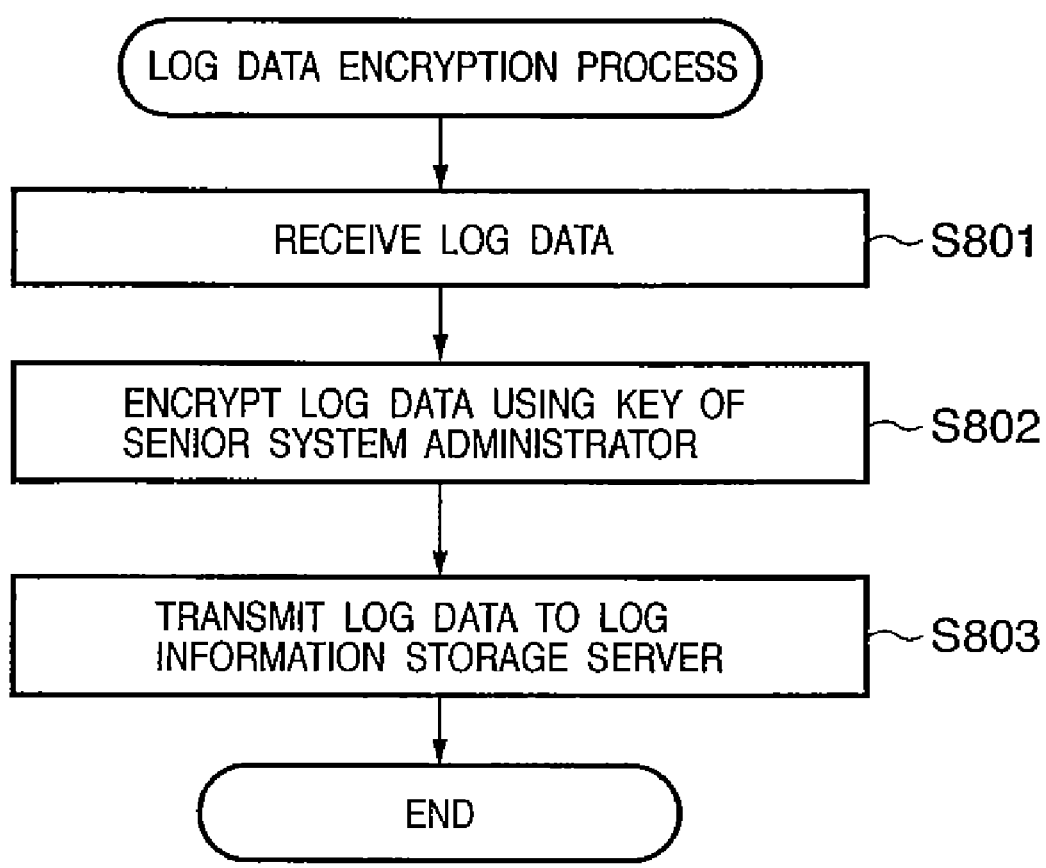
FIG. 17 is a flowchart showing a process to encrypt and transfer log data in the job tracking management unit 500.

A process to encrypt and transfer log data by a job tracking management unit 500 according to the second embodiment will be described with reference to FIG. 17.

In step S801, the job tracking management unit 500 starts receiving log data from a job tracking unit 400. After sequentially receiving data, connection between the job tracking management unit 500 and the job tracking unit 400 is canceled in response to the end of reception. The job tracking management unit 500 converts the log data into a file of a format capable of registering the log data in the database of a log information storage server 3000.

In step S802, the job tracking management unit 500 encrypts print contents extracted from the log data saved in step S801 by using a senior administrator key. The senior administrator key is, for example, a password which is defined in advance and saved as information in the job tracking management unit. By using this key, the job tracking management unit 500 encrypts print contents. The key is also saved in a tracking management client application (to be described later), and becomes available only when authenticating a user as a senior administrator. Print content data is encrypted by an encryption API provided by an operating system, or a uniquely developed encryption module. As keys, it is also possible to give a private decryption key to a senior administrator and encrypt data by the job tracking management unit using a public encryption key. In the use of a secret key, access is limited to permit only a senior administrator to access a senior administrator key (decryption key). In the use of a public key, a senior administrator can save a decryption key in his portable memory device or the like. This makes key management by the job tracking management unit 500 much easier than in the secret key system. This also easily prevents illicit access to key information and illicit access to log data using the acquired key.

In step S803, the job tracking management unit 500 transfers log data containing print contents encrypted in step S802 to a log information storage server 3000, registering the log data in the database of the log information storage server 3000. In step S803, the job tracking management unit 500 may extract storage destination folder information from the log data, as represented by steps S402 and S403 in FIG. 14. The job tracking management unit 500 may also transfer log data so as to register it in a detailed storage location in the database of the log information storage server 3000 that is represented by the storage destination folder information. At this time, the job tracking management unit 500 does not encrypt the print contents of log data to be distributed to a default folder.

These procedures can limit access to log data by a user (administrator) having no decryption key. The log data encryption/transfer process by the job tracking management unit 500 has been described.

<Reference of Encrypted Log Data in Tracking Management Client 4000>

Figure 18:
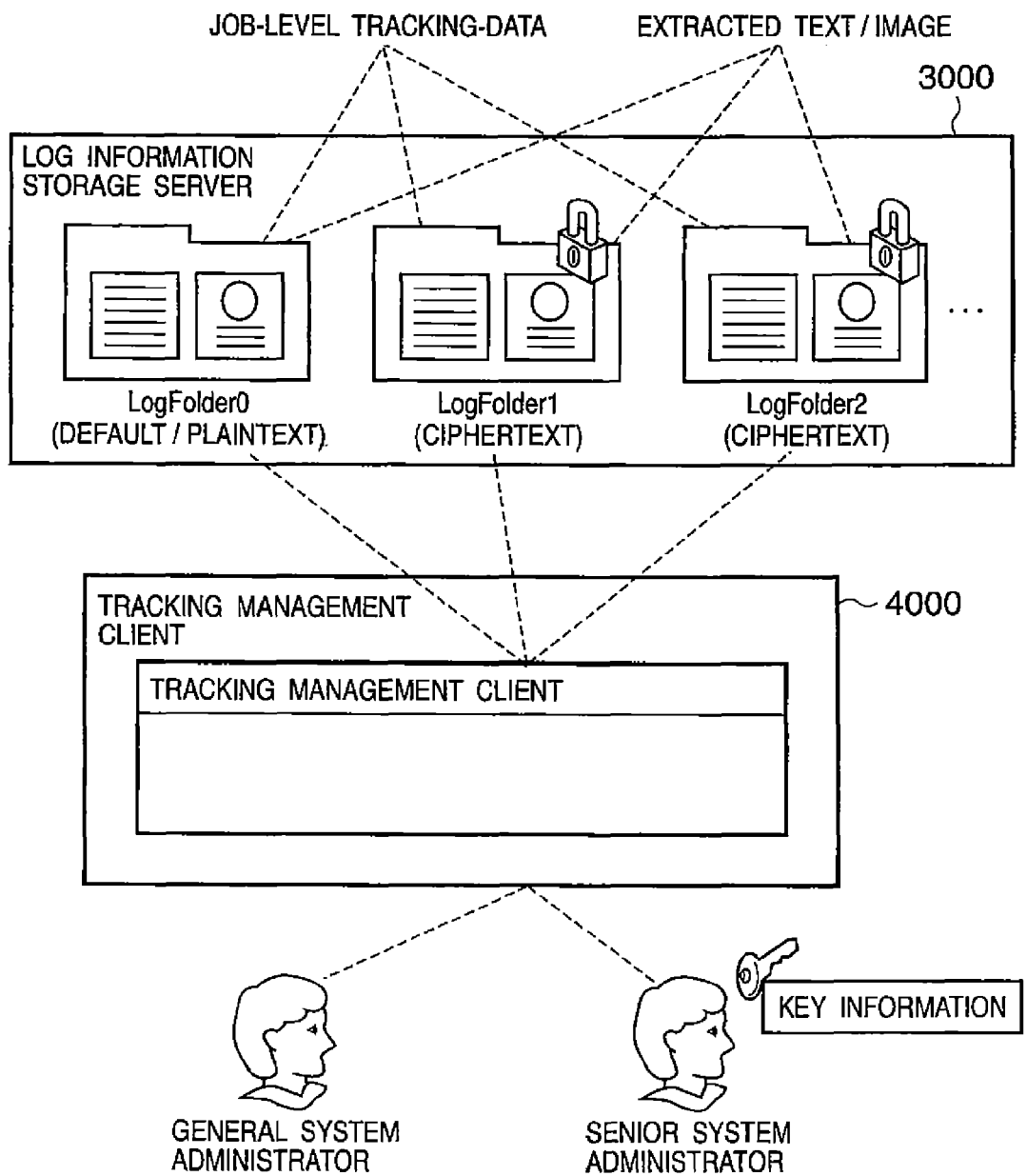
FIG. 18 is a view showing a method of referring to encrypted log data by the system administrator using the tracking management client 4000.

A method of referring to encrypted log data in a tracking management client 4000 will be described with reference to FIG. 18.

Similar to the first embodiment, the log information storage server 3000 is an information device having a log data-registered database. The print contents of log data are encrypted and registered by the process of the job tracking management unit 500 that has been described with reference to FIG. 17. As shown in FIG. 16, respective log data having encrypted print contents may be distributed and registered in a plurality of folders by a virtual storage method.

Similar to the first embodiment, the tracking management client 4000 is an information device which allows a system administrator who manages and operates the network printing system according to the present invention, to access the database of the log information storage server 3000. A tracking management client application for referring to the database is installed in the tracking management client 4000 and is available. The tracking management application is executed under the authority of a directory user having an access right capable of referring to all folders in the database of the log information storage server 3000 in directory services provided by a directory server 2000. The tracking management client application has an authentication function of authenticating a user by prompting him to input a user name and password upon activating the tracking management client application.

When the tracking management client application determines by authentication that its operator is a senior administrator, he can use a senior administrator key saved in the tracking management client application. The tracking management client application decrypts encrypted print contents, converts them into a content-readable state, and allows the operator to refer to the print contents.

Print content data is decrypted using a decryption means provided as a function paired with an encryption API which is used in encryption and provided by an operating system, or a uniquely developed encryption module.

If the tracking management client application determines by authentication that its operator is a senior administrator, he can access all folders in the database and refer to all log data in the database.

If the tracking management client application determines by authentication that its operator is a general administrator, no print content is decrypted using a senior administrator key. The general administrator can access a job-level print log contained in log data, but cannot refer to encrypted print contents in a readable state.

If the tracking management client application determines by authentication that its operator is a general administrator, he can refer to only default folders in the database, and folders for which he has an access right. The operator cannot access the remaining folders.

According to the second embodiment of the present invention, a general administrator can refer to only unencrypted readable print contents of log data stored in a folder for which he has an access right. The second embodiment can reduce the risk of leaking confidential information through print contents. Reference of encrypted log data in the tracking management client 4000 has been explained.

The above description does not contain procedures to specify log data accessed by a user. For example, the tracking management client 4000 refers to the storage destination folder of each user/group registered in the directory user (group) object table of the directory server 2000. The tracking management client 4000 lists all the print job names and the like of log data stored in the folder. In the list, the user designates log data to be accessed. The tracking management client 4000 accesses the designated log data, reads it out, and outputs (e.g., displays) it. List display and tracking-data access comply with the access limitation.

FIG. 21 shows an example of a sequence for referring to log data. The example of FIG. 21 represents a method different from the above-described one. According to the method in FIG. 21, the log information storage server 3000 creates log data directory information in storing log data. The directory information registers a print job ID and the file name of log data containing the name of a folder which stores log data of the print job, in association with each other. When access by a general administrator is limited, information capable of specifying each print job is registered instead of the print job name.

The tracking management client 4000 executes the tracking management application to authenticate a user on the basis of authentication information input by the user (S2101). The directory server 2000 desirably performs this authentication. The tracking management client 4000 refers to log data directory information, and displays a list of print job IDs (S2102). If access is limited, the tracking management client 4000 displays alternative data under the access limitation. The tracking management client 4000 transmits, to the log information storage server 3000, a request to access (read) a folder which saves log data of a print job selected by the user (S2103). The tracking management client 4000 simultaneously transmits authentication information such as a user ID.

The log information storage server 3000 receives the access request (S2201). The log information storage server 3000 reads designated log data from the designated folder, and transmits it to the tracking management client 4000 (S2202).

The tracking management client 4000 receives a response from the log information storage server 3000 (S2104), and determines whether the contents represent a ciphertext or plaintext (S2105). For this determination, information representing execution/non-execution of encryption is attached to log data, and the information value is determined. Alternatively, after adding an error correcting code (or error detecting code) to the start of log data or the like, data is encrypted and an error is checked. In the case of adding an error correcting code, it is also available for determining whether data has correctly been decrypted. If the contents represent a ciphertext, the tracking management client 4000 requests input of a decryption key (S2107). If a senior administrator manages the decryption key, the process waits for an input from the senior administrator. If only a user having a predetermined access right can access the decryption key, the process waits for input of authentication information which certifies the access right. If authentication is successful, the user acquires and utilizes the decryption key. The tracking management client 4000 performs a decryption process using the acquired decryption key (S2108). The tracking management client 4000 determines whether decryption is successful (S2109). If decryption fails, the tracking management client 4000 displays a message that access is rejected (S2110). If decryption is successful, the tracking management client 4000 outputs a contained print log and content information in a predetermined format (S2106). In determination of step S2109, for example, an error correcting code is checked after the decryption process, as described in step S2105, and if no error is detected, it is determined that decryption is successful.

Even if the tracking management client 4000 determines in step S2105 that the contents represent a plaintext, it outputs a print log and content information contained in the log data in a predetermined format in step S2106.

Reference of log data by a system administrator in the tracking management client has been described. The second embodiment can control access to log data by encrypting log data and storing it in a folder. For example, the second embodiment can permit only an administrator having a decryption key or a right to access the decryption key, to access log data, and inhibit other administrators and general users from accessing log data. This setting can prevent access to access-limited data by a user having no access right through log data containing a print log and the like.

In the second embodiment, log data is encrypted, so access to it can be limited even if a physical device is stolen. Further, access to confidential information by eavesdropping can be prevented on a communication channel when transmitting log data to the log information storage server 3000 from the host computer 1000 which prints.

Other Embodiments

In the first or second embodiment, the directory management client designates the log information save destination for each user or group using directory services (e.g., Active Directory provided by Microsoft). When saving log information in a specific folder, it is saved after encrypted with, e.g., the public key of a senior administrator. In the first or second embodiment, a server administrator has an authority to browse all folders in the server, but cannot browse log information in the specific folder unless he has the private key of the senior administrator of the tracking management client.

Instead of switching between encryption and non-encryption for each save destination folder, like the first or second embodiment, it is also possible to identify, from log information, a user who has issued a print job or a group to which the user belongs, encrypt the log information with the public key of the user or group, and save the encrypted log information in a folder.

In this embodiment, the log information save destination folder may change for each user/group, or a specific folder may save the log without changing the save destination.

When browsing log information, it is browsed after decrypted with the private key for each user or group held by the tracking management client. A server administrator can browse all folders in the server, but cannot browse log information unless he utilizes the tracking management client or tracking management application.

As has been described above, the present invention can implement a system capable of changing the log data generation method for each user or group, and preventing leakage of confidential information through log data by, for example, setting not to contain any print image in log data of a given group, in a network printing system capable of accumulating printed contents and tracking the source of a printing process request.

The present invention can also provide a system capable of preventing leakage of confidential information through log data by registering log data in a storage location in the log information storage server that can be referred to by only a system administrator having a predetermined access right.

The present invention can also achieve a system capable of preventing leakage of confidential information through log data by encrypting log data with the key of a system administrator having a predetermined access right, and registering the encrypted log data in the log information storage server.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-321397 filed on Nov. 4, 2005 which is hereby incorporated by reference herein in its entirety.

What is claimed is:

1. A printing management system which manages a log of a print job, comprising:
   a storage specification unit which associates a storage location for tracking data for tracking an executed print job with user information, and specifies the storage location;
   a retention unit which retains the storage location for tracking data as tracking setting information;
   an acquisition unit which acquires tracking setting information corresponding to user information for information indicating an issuing source of the print job, from the tracking setting information retained by the retention unit;

a save unit which saves tracking data created based on the print job in the storage location for tracking data set in the tracking setting information acquired by the acquisition unit;

a determination unit which determines, in accordance with a request to access the tracking data saved in the save unit, whether to permit or reject the access request; and an access unit which reads the tracking data subjected to the access request when the determination unit determines to permit the access request, wherein the tracking data contains print log information and print content information, wherein the print log information includes at least one of a user ID, a computer name, print date and a print file name, and wherein the print content information includes at least one of a print image, a thumbnail of a print image and text contained in the print data.

2. The system according to claim 1, wherein the determination unit permits the access request when a right to access the storage location of the tracking data is set in correspondence with a user ID of a requesting user of the access request.

3. The system according to claim 1, further comprising a decryption unit which reads out and decrypts tracking data encrypted and saved by the save unit, and wherein the access unit permits the access request when decryption by the decryption unit is successful and reads the tracking data subjected to the access request.

4. The system according to claim 3, wherein the decryption unit determines whether to encrypt the tracking data in accordance with the storage location corresponding to the tracking data, the save unit encrypts tracking data corresponding to a predetermined storage location, and another tracking data is saved in a corresponding storage location without encrypting the other tracking data.

5. A print control system according to claim 1, wherein the save unit saves print log information and print content information contained in the tracking data in separate storage locations having different access rights, respectively.

6. A non-transitory computer-readable medium which stores a program therein for causing a computer to execute a printing management method, the method comprising:

associating a storage location for tracking data for tracking an executed print job with user information, and specifying the storage location;

acquiring tracking setting information corresponding to user information for information indicating an issuing source of the print job, from the storage location for tracking data retained as the tracking setting information;

saving tracking data created based on the print job in the storage location for tracking data set in the tracking setting information acquired in the acquiring step;

determining, in accordance with a request to access the tracking data saved in the saving step, whether to permit or reject the access request; and reading the tracking data subjected to the access request when it is determined to permit the access request in the determining step, wherein the tracking data contains print log information and print content information, wherein the print log information includes at least one of a user ID, a computer name, print date and a print file name, and wherein the print content information includes at least one of a print image, a thumbnail of a print image and text contained in the print data.

7. A printing management method of managing a log of a print job, which is performed by a printing management system, the method comprising:

associating a storage location for tracking data for tracking an executed print job with user information, and specifying the storage location;

acquiring tracking setting information corresponding to user information for information indicating an issuing source of the print job, from the storage location for tracking data retained as the tracking setting information;

saving tracking data created based on the print job in the storage location for tracking data set in the tracking setting information acquired in the acquiring step;

determining, in accordance with a request to access the tracking data saved in the saving step, whether to permit or reject the access request; and reading the tracking data subjected to the access request when it is determined to permit the access request in the determining step, wherein the tracking data contains print log information and print content information, wherein the print log information includes at least one of a user ID, a computer name, print date and a print file name, and wherein the print content information includes at least one of a print image, a thumbnail of a print image and text contained in the print data.

* * * * *